(12) United States Patent
Yoshizawa

(10) Patent No.: US 10,278,221 B2
(45) Date of Patent: *Apr. 30, 2019

(54) COMMUNICATION CONTROL DEVICE, COMMUNICATION CONTROL METHOD, TERMINAL DEVICE, AND PROGRAM

(71) Applicant: Sony Corporation, Tokyo (JP)

(72) Inventor: Atsushi Yoshizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 15/459,469

(22) Filed: Mar. 15, 2017

(65) Prior Publication Data

US 2017/0196035 A1 Jul. 6, 2017

Related U.S. Application Data

(63) Continuation of application No. 14/431,494, filed as application No. PCT/JP2013/076107 on Sep. 26, 2013, now Pat. No. 9,661,613.

(30) Foreign Application Priority Data

Dec. 5, 2012 (JP) ................................ 2012-266331

(51) Int. Cl.
*H04W 76/14* (2018.01)
*H04W 72/04* (2009.01)
(Continued)

(52) U.S. Cl.
CPC ......... *H04W 76/14* (2018.02); *H04W 68/005* (2013.01); *H04W 68/02* (2013.01);
(Continued)

(58) Field of Classification Search
CPC ..................................................... H04W 76/14
See application file for complete search history.

(56) References Cited

U.S. PATENT DOCUMENTS 9,661,613 B2 * 5/2017 Yoshizawa .......... H04W 72/042
2010/0014463 A1 1/2010 Nagai et al.
(Continued)

FOREIGN PATENT DOCUMENTS

CN 102246575 A 11/2011
JP 2001-203680 A 7/2001
(Continued)

OTHER PUBLICATIONS

International Search Report dated Nov. 12, 2013 in PCT/JP2013/076107.

(Continued)

*Primary Examiner* — Jason E Mattis
(74) *Attorney, Agent, or Firm* — Xsensus LLP

(57) ABSTRACT

There is provided a communication control device including a decision unit configured to decide radio resources available for inter-device communication within a cell, and a notification unit configured to notify a terminal device located within the cell of the radio resources. When the radio resources are modified, the notification unit gives notification of modification of the radio resources through paging. When the radio resources are modified, the radio resources before the modification refrain from being used for the inter-device communication after a predetermined timing and the radio resources after the modification are used for the inter-device communication after the predetermined timing.

20 Claims, 27 Drawing Sheets

(51) Int. Cl.
  *H04W 68/02* (2009.01)
  *H04W 74/08* (2009.01)
  *H04W 68/00* (2009.01)
  *H04W 92/18* (2009.01)
  *H04W 74/00* (2009.01)

(52) U.S. Cl.
  CPC ..... *H04W 72/042* (2013.01); *H04W 72/0406* (2013.01); *H04W 72/0446* (2013.01); *H04W 74/0833* (2013.01); *H04W 68/00* (2013.01); *H04W 74/006* (2013.01); *H04W 92/18* (2013.01)

(56) References Cited

U.S. PATENT DOCUMENTS

| | | |
|---|---|---|
| 2010/0120452 A1 | 5/2010 | Somasundaram et al. |
| 2011/0098043 A1 | 4/2011 | Yu et al. |
| 2011/0235185 A1 | 9/2011 | Kanamori |
| 2011/0261759 A1 | 10/2011 | Yamada et al. |
| 2012/0093098 A1 | 4/2012 | Charbit et al. |
| 2013/0065585 A1 | 3/2013 | Pelletier et al. |
| 2013/0157670 A1 | 6/2013 | Koskela et al. |
| 2013/0308551 A1 | 11/2013 | Madan et al. |
| 2013/0308552 A1 | 11/2013 | Madan et al. |
| 2014/0094183 A1 | 4/2014 | Gao et al. |
| 2014/0254501 A1 | 9/2014 | Somasundaram et al. |
| 2014/0315562 A1 | 10/2014 | Lim et al. |
| 2014/0321423 A1 | 10/2014 | Kalhan |

FOREIGN PATENT DOCUMENTS

| | | |
|---|---|---|
| JP | 2007-512755 A | 5/2007 |
| WO | WO 2005/053343 A1 | 6/2005 |
| WO | WO 2008/069245 A1 | 6/2008 |
| WO | WO 2010/047166 A1 | 4/2010 |
| WO | WO 2011/135794 A1 | 11/2011 |
| WO | WO 2012/063792 A1 | 5/2012 |
| WO | WO 2012/093583 A1 | 7/2012 |
| WO | WO 2012/159270 A1 | 11/2012 |

OTHER PUBLICATIONS

Extended European Search Report dated Jun. 6, 2016 in Patent Application No. 13860983.9.

Technical Specification ETSI TS 136 331 V10.0.0, LTE Evolved Terrestrial Radio Access (E-TRA) Radio Resource Control (RRC) Protocol Specification, Jan. 2011, pp. 23-24.

Combined Office Action and Search Report dated Jan. 4, 2018 in Chinese Patent Application No. 201380061018.6 (with English language translation) citing reference AO therein, 24 pages.

* cited by examiner

FIG.4

| PAGING RECORD LIST | PAGING RECORD 1 | UE IDENTITY 1 (S-TMISI, IMSI) |
| | | CORE NETWORK DOMAIN 1 (CS, PS) |
| | PAGING RECORD 2 | UE IDENTITY 2 (S-TMISI, IMSI) |
| | | CORE NETWORK DOMAIN 2 (CS, PS) |
| | ... | |
| SYSTEM INFORMATION MODIFICATION | | |
| EARTHQUAKE AND TSUNAMI WARNING SYSTEM (ETWS) INDICATION | | |

FIG.14

| RADIO FRAME NUMBER | SUBFRAME NUMBER |
|---|---|
| SFN mod 2 ≠ 0 | 3, 4, 7, 8, 9 |

FIG.15

| Paging Record List | Paging Record 1 | UE Identity 1 (S-TMISI, IMSI) |
| | | Core Network Domain 1 (CS, PS) |
| | Paging Record 2 | UE Identity 2 (S-TMISI, IMSI) |
| | | Core Network Domain 2 (CS, PS) |
| | ... | |
| System Information Modification | | |
| Earthquake and Tsunami Warning System (ETWS) Indication | | |
| D2D Resource Modification | | |

FIG.22

| D2D GROUP ID | RADIO FRAME NUMBER | SUBFRAME NUMBER |
|---|---|---|
| GROUP A | SFN mod 2 ≠ 0 | 3, 4 |
| GROUP B | SFN mod 2 ≠ 0 | 7, 8 |
| GROUP C | SFN mod 2 ≠ 0 | 9 |

COMMUNICATION CONTROL DEVICE, COMMUNICATION CONTROL METHOD, TERMINAL DEVICE, AND PROGRAM

CROSS-REFERENCE TO RELATED APPLICATIONS

The present application is a continuation of U.S. application Ser. No. 14/431,494, filed on Mar. 26, 2015, which is a National Stage of PCT/JP2013/076107, filed Sep. 26, 2013, and claims priority to Japanese Patent Application No. 2012-266331, filed Dec. 5, 2012, the entire contents of each of which are incorporated herein by reference.

TECHNICAL FIELD

The present disclosure relates to a communication control device, a communication control method, a terminal device, and a program.

BACKGROUND ART

Near field inter-terminal communication or device-to-device communication (D2D communication) is a communication form in which a signal is directly transmitted between terminal devices, unlike a communication form in which a signal passes through a base station in cellular communication. Therefore, in the D2D communication, new use forms of terminal devices unlike the existing cellular communication are expected to appear. For example, various applications such as information sharing by data communication between near terminal devices or a group of near terminal devices, information distribution from installed terminal devices, and autonomous communication between devices called Machine Type Communication (MTC) can be considered.

With regard to the significant increase in data traffic with the recent increase of smartphones, the D2D communication can also be considered to be utilized in off-loading of data. For example, when terminal devices are in a state suitable for the D2D communication such as a case in which a distance between terminal devices is small, resource consumption and process loads in a Radio Access Network (RAN) can be suppressed by off-loading moving image data in the D2D communication. Thus, the D2D communication is useful for both communication providers and users. Therefore, at present, the D2D communication is recognized and noticed as one of the important technical areas necessary for Long Term Evolution (LTE) of the 3rd Generation Partnership Project (3GPP) standardization commission as well.

For example, as a technology related to D2D communication according to the same communication scheme as a communication scheme of cellular communication, a technology for Peer-to-Peer (P2P) communication between user equipments (UEs) according to Time Division-Code Division Multiple Access (TD-CDMA) is disclosed in Patent Literature 1.

CITATION LIST

Patent Literature

Patent Literature 1: JP 2007-512755T

SUMMARY OF INVENTION

Technical Problem

According to the technology of Patent Literature 1, radio resources can be allocated to the UEs. However, when the resources allocated to the UEs are modified, it is not clear how the UEs recognize the modification of the resources. For example, according to the technology of Patent Literature 1, the UEs are assumed to be in connection states in a cell. Therefore, when the UEs are in an idle mode, the UEs are not guaranteed to recognize the modification of the radio resources. As a result, the UEs may perform D2D communication using radio resources not admitted in the D2D communication. Further, even when the UEs recognize and use the allocated radio resources, there is a possibility of the partner UEs of the UEs in the D2D communication not recognizing and using the radio resources. As a result, an error may occur in the D2D communication between the UEs.

It is desirable to provide a terminal device in an idle state of cellular communication with a structure in which an error in inter-device communication can be suppressed using radio resources admitted in the inter-device communication.

Solution to Problem

According to an embodiment of the present disclosure, there is provided a communication control device including a decision unit configured to decide radio resources available for inter-device communication within a cell, and a notification unit configured to notify a terminal device located within the cell of the radio resources. When the radio resources are modified, the notification unit gives notification of modification of the radio resources through paging. When the radio resources are modified, the radio resources before the modification refrain from being used for the inter-device communication after a predetermined timing and the radio resources after the modification are used for the inter-device communication after the predetermined timing.

According to another embodiment of the present disclosure, there is provided a communication control method including deciding radio resources available for inter-device communication within a cell, notifying a terminal device located within the cell of the radio resources, and when the radio resources are modified, giving notification of modification of the radio resources through paging. When the radio resources are modified, the radio resources before the modification refrain from being used for the inter-device communication after a predetermined timing and the radio resources after the modification are used for the inter-device communication after the predetermined timing.

According to another embodiment of the present disclosure, there is provided a terminal device including a resource recognition unit configured to recognize radio resources available for inter-device communication within a cell when the radio resources are decided and notification thereof is given, a control unit configured to control the inter-device communication in a manner that the recognized radio resources are used for the inter-device communication, and a modification recognition unit configured to recognize modification of the radio resources when the radio resources are modified and notification of the modification of the radio resources is given through paging. When the radio resources are modified, the control unit controls the inter-device communication in a manner that the radio resources before the modification refrain from being used for the inter-device communication after a predetermined timing and the radio resources after the modification are used for the inter-device communication after the predetermined timing.

According to another embodiment of the present disclosure, there is provided a program causing a computer to function as a resource recognition unit configured to recognize radio resources available for inter-device communication within a cell when the radio resources are decided and notification thereof is given, a control unit configured to control the inter-device communication in a manner that the recognized radio resources are used for the inter-device communication, and a modification recognition unit configured to recognize modification of the radio resources when the radio resources are modified and notification of the modification of the radio resources is given through paging. When the radio resources are modified, the control unit controls the inter-device communication in a manner that the radio resources before the modification refrain from being used for the inter-device communication after a predetermined timing and the radio resources after the modification are used for the inter-device communication after the predetermined timing.

Advantageous Effects of Invention

According to one or more embodiments of the present disclosure described above, it is possible to suppress an error in the inter-device communication using radio resources admitted in the inter-device communication in the terminal device in the idle mode of cellular communication.

BRIEF DESCRIPTION OF DRAWINGS

FIG. 4 is an explanatory diagram illustrating an example of information included in a paging message.

FIG. 14 is an explanatory diagram illustrating an example of the decided D2D resources.

FIG. 15 is an explanatory diagram illustrating an example of information included in the paging message according to the embodiment.

FIG. 22 is an explanatory diagram illustrating an example of the D2D resources decided for each group of the D2D communication.

DESCRIPTION OF EMBODIMENTS

Figure 1:
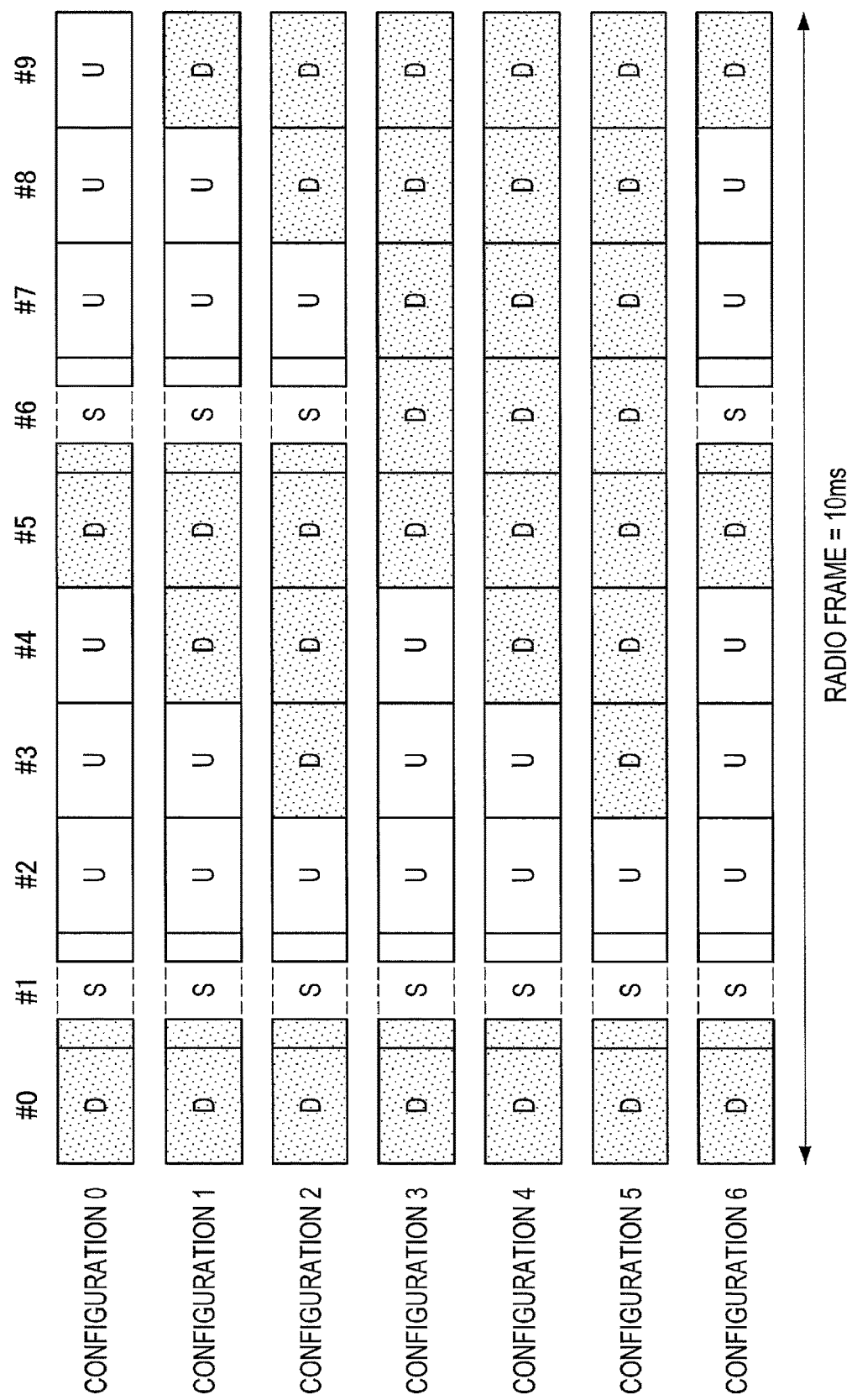
FIG. 1 is an explanatory diagram illustrating TDD configurations.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Radio communication technology in 3GPP
2. Schematic configuration of radio communication system
3. Configuration of base station
4. Configuration of terminal device
5. Flow of process
6. Modification example
  6.1. Overview
  6.2. Configuration of base station
  6.3. Flow of process
7. Application examples
  7.1. Application example of base station
  7.2. Application example of terminal device
8. Conclusion

1. RADIO COMMUNICATION TECHNOLOGY IN 3GPP

First, a technology for radio communication in 3GPP will be described with reference to FIGS. 1 to 9.

(TDD)

In LTE, Frequency Division Duplex (FDD) or Time Division Duplexing (TDD) is adopted as a duplex communication scheme. In FDD, different frequency bands are used for downlink transmission and uplink transmission. In TDD, the same frequency band is used for downlink transmission and uplink transmission, but the downlink transmission and the uplink transmission are performed at different times.

For example, in LTE, 10 subframes are included in each radio frame of 10 ms. Further, 7 TDD configurations #0 to #6 are decided as configurations of the radio frame in the TDD. Hereinafter, a specific example of this point will be described with reference to FIG. 1.

FIG. 1 is an explanatory diagram illustrating the TDD configurations. In FIG. 1, 7 TDD configurations, that is, configurations 0 to 6, are illustrated. As described above, the radio frame includes 10 subframes. Each subframe is set to one of a downlink subframe (D), an uplink subframe (U), and a special subframe (S). The special subframe is a subframe that is inserted between the downlink subframe and the uplink subframe in order to ensure a time for switching between downlink and uplink.

The TDD configuration is transmitted in system information. More specifically, the TDD configuration is transmitted in System Information Block Type 1 (SIB 1).

(Paging)

Paging Occasion

A paging occasion in LTE will be described with reference to FIGS. 2 and 3.

In LTE, the paging occasion is decided. More specifically, a system frame number (SFN) of the radio frame for performing paging and a subframe for performing the paging are decided.

The SFN of the radio frame for performing the paging in regard to each terminal device (that is, UE) is decided according to the following expression.

$$\text{SFN mod } T = (T/N)(UE\_ID \text{ mod } N) \qquad \text{[Math 1]}$$

UE_ID is 10 low-order bits of an International Mobile Subscriber Identity (IMSI) of the terminal device (that is, the UE). T is a paging period. In other words, T is a Discontinuous Reception (DRX) cycle. N is a smaller value between T and nB. That is, N=Min(T, nB) is satisfied. T and nB are transmitted in System Information Block Type 2 (SIB 2) of the system information.

T and nB are selected from the following values.

$$\{32, 64, 128, 250\} \qquad \text{[Math 2]}$$

$$nB = \{4T, 2T, T, T/4, T/8, T/16, T/32\} \qquad \text{[Math 3]}$$

As described above, the radio frame for performing the paging is decided in regard to each terminal device. Hereinafter, a specific example of the paging occasion of each terminal device will be described with reference to FIG. 2.

Figure 2:
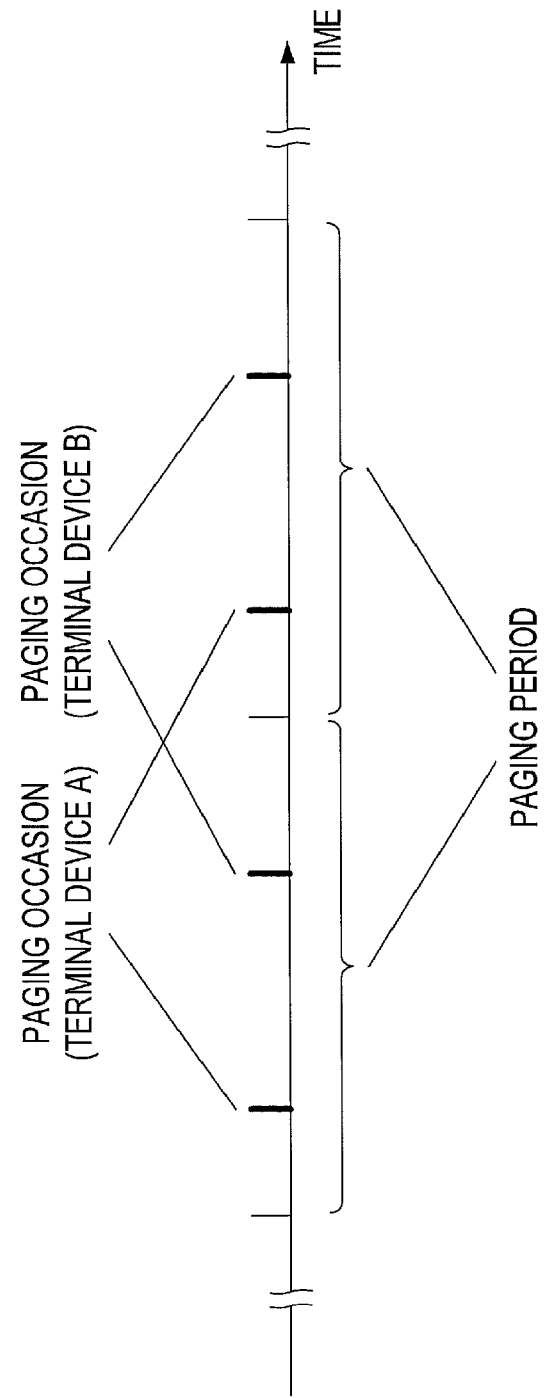
FIG. 2 is an explanatory diagram illustrating an example of a paging occasion of each terminal device.

FIG. 2 is an explanatory diagram illustrating an example of a paging occasion of each terminal device. The paging occasion of each terminal device (terminal devices A and B) is illustrated in FIG. 2. Thus, for example, in each paging period, the paging occasion is present for each terminal device (terminal devices A and B). For example, when another terminal device is added, a paging occasion can be newly added.

In LTE, a subframe for performing the paging is decided according to the value of a parameter Ns. For example, for both of TDD and FDD, the value of Ns is one of 1, 2, and 3.

For example, for TDD, the paging can be performed in subframe #0 when Ns=1. The paging can be performed in subframe #0 and subframe #5 when Ns=2. The paging can be performed in subframe #0, subframe #5, and subframe #6 when Ns=3. Hereinafter, this point will be described specifically with reference to FIG. 3.

Figure 3:
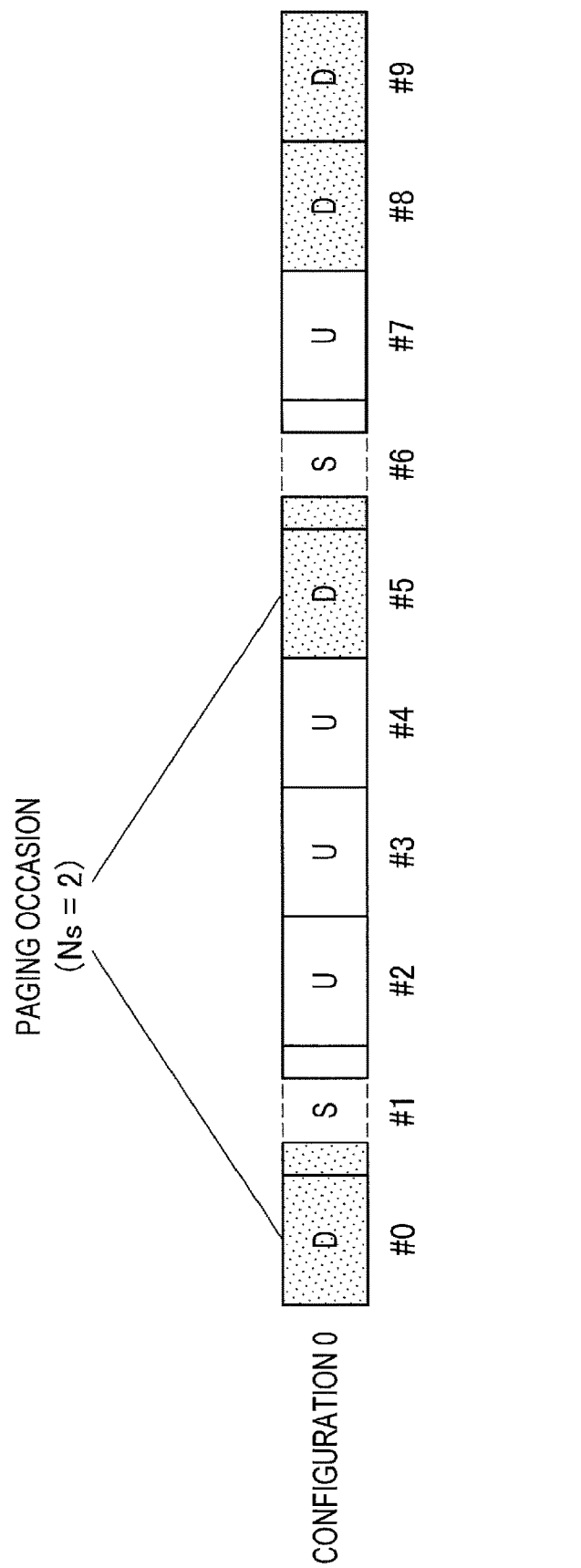
FIG. 3 is an explanatory diagram illustrating an example of a subframe of the paging occasion.

FIG. 3 is an explanatory diagram illustrating an example of a subframe of the paging occasion. TDD configuration 0 is illustrated in FIG. 3. For example, when Ns=2, the paging occasion is thus present in subframe #0 and subframe #5 which are the downlink subframes.

In FDD, the paging can be performed in subframe #9 when Ns=1. The paging can be performed in subframe #4 and subframe #9 when Ns=2. The paging can be performed in subframe #0, subframe #4, subframe #5, and subframe #9 when Ns=3.

As described above, when Ns=2 and Ns=3, the paging can be performed in the plurality of subframes. The subframes in which the paging is performed in each UE are decided depending on UE_ID of each UE.

As described above, the subframes in which the paging is performed in each terminal device are decided.

Paging Message

Next, specific content of a paging message will be described with reference to FIG. 4.

FIG. 4 is an explanatory diagram illustrating an example of information included in a paging message. Referring to FIG. 4, the paging message includes, for example, a paging record list, a flag of system information modification, and a flag of an earthquake and tsunami warning system (ETWS) indication.

The paging records are lists of a maximum of 16 call records. The paging record list includes a UE identity of the terminal device (that is, the UE) to be called. The UE identity in the paging record list is an SAE-Temporary Mobile Subscriber Identity (S-TMSI) or an International Mobile Subscriber Identity (IMSI). The paging record list includes information regarding a core network domain of a paging source. The information indicates whether the core network domain of the paging source is a circuit switched (CS) domain or a packet switched (PS) domain.

The flag of the system information modification indicates whether the system information is modified. For example, when the system information is modified, the flag is 1. When the system information is not modified, the flag is 0. Basically, the flag of the system information modification is 1 when any system information is modified. However, the flag of the system information modification is not 1 (that is, remains to be 0) when only exceptional information of a part of the system information is modified. The exceptional information includes, for example, information regarding the ETWS and information regarding a commercial mobile alert system (CMAS).

The flag of the ETWS indication indicates whether an indication of an earthquake and tsunami warning system is given.

Operation of Terminal Device in Regard to Paging

Next, an operation of the terminal device in regard to the paging will be described with reference to FIG. 5.

Figure 5:
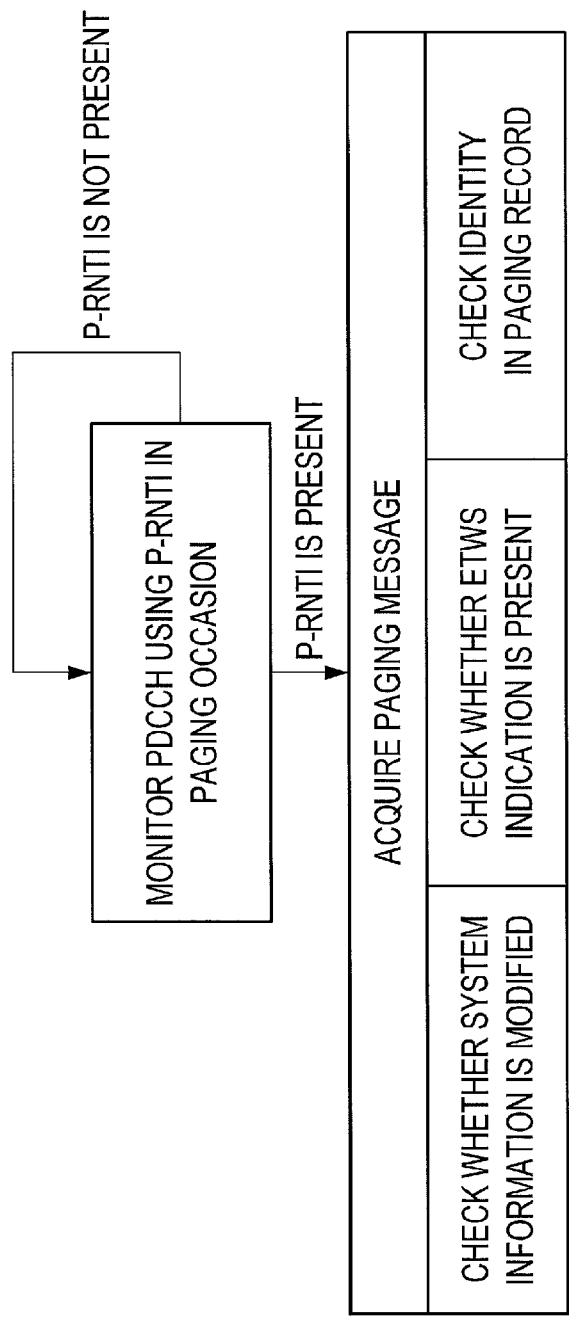
FIG. 5 is an explanatory diagram illustrating an example of an operation of the terminal device in regard to paging.

FIG. 5 is an explanatory diagram illustrating an example of the operation of the terminal device in regard to the paging. Referring to FIG. 5, the terminal device in the idle mode first monitors whether a Paging Radio Network Temporary Identifier (P-RNTI) is present in a Physical Downlink Control CHannel (PDCCH) in the subframe of a predetermined paging occasion.

When a P-RNTT is present in the PDCCH in the subframe of the paging occasion, the paging message is included in the subframe. Accordingly, the terminal device acquires the paging message. As described above, the paging message includes the paging record list, the flag of the system information modification, and the flag of the ETWS indication. When no P-RNTI is present in the PDCCH, the terminal device monitors the PDCCH in a subsequent paging occasion again.

The terminal device (that is, the UE) checks whether the UE identity destined for the self-device is present in the paging record list when the terminal device acquires the paging message. When the UE identity destined for the self-device is present in the paging record list, the terminal device recognizes that the terminal device is called from a network. In this case, the terminal device checks, from the information regarding the core network domain, whether the call source is the CS domain or the PS domain. Conversely, when the UE identity destined for the self-device is not present in the paging record list, the terminal device monitors the PDCCH in a subsequent paging occasion again.

The terminal device also checks, from the flag of the system information modification, whether the system information is modified when the terminal device acquires the paging message. When the system information is modified, the terminal device acquires the system information again.

The terminal device checks, from the flag of the ETWS indication, whether the ETWS indication is present when the terminal device acquires the paging message. When the ETWS indication is given, the terminal device performs a predetermined operation including an emergency alarm operation.

(Random Access)

Next, a timing of random access will be described with reference to FIGS. 6 and 7.

The terminal device transmits a PRACH preamble with a Physical Random Access CHannel (PRACH) in a random access procedure for transition from the idle mode of radio resource control (RRC) to a connection mode of the RRC (RRC connected mode). In LTE, a transmission timing (that is, a timing of the PRACH) of the PRACH preamble is designated in advance by a PRACH configuration index.

First, the PRACH configuration index designates a radio frame (that is, a radio frame with which the PRACH preamble can be transmitted) in which the PRACH is located. Specifically, according to the PRACH configuration index, the PRACH is located in each radio frame, radio frames in which the SFN is even, or radio frames in which the SFN is odd. Thus, the PRACH is present at intervals of 10 ms or intervals of 20 ms. Hereinafter, a specific example of this point will be described with reference to FIG. 6.

Figure 6:
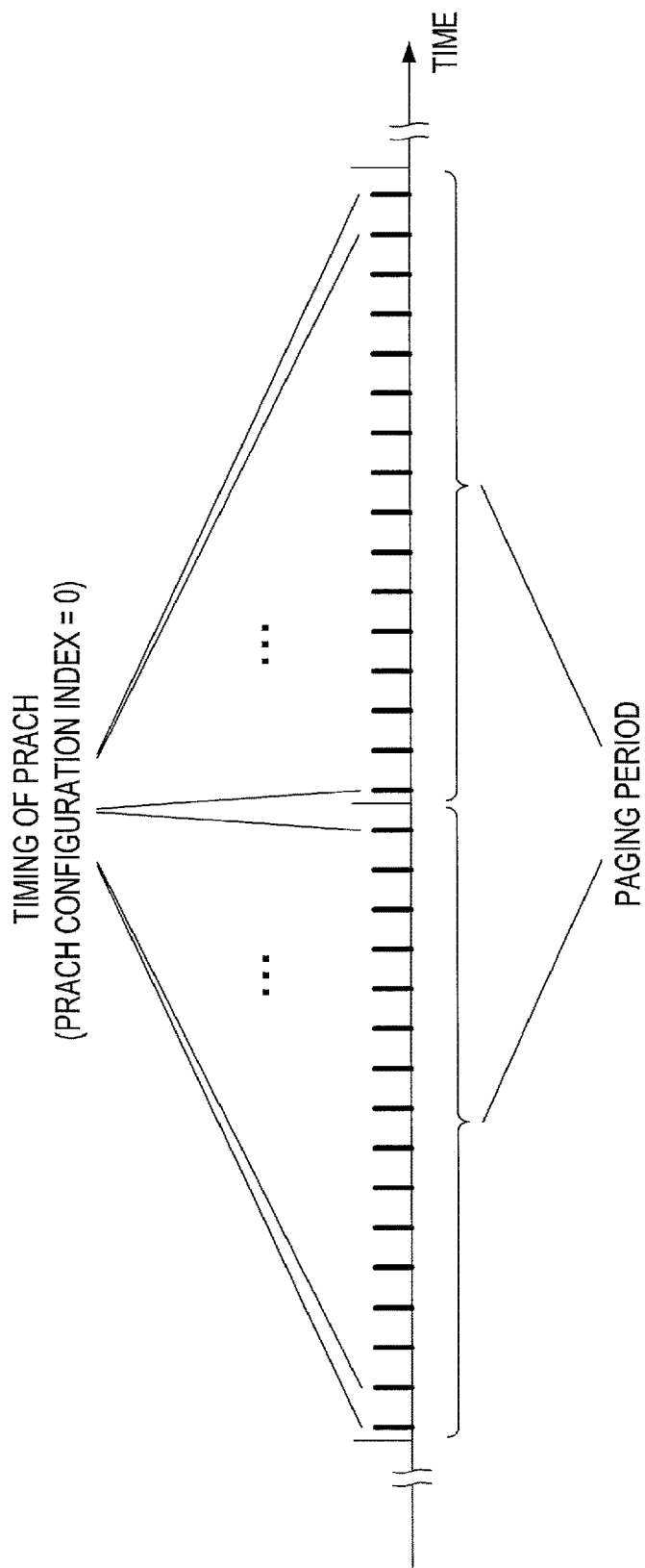
FIG. 6 is an explanatory diagram illustrating an example of a radio frame in which a PRACH is located.

FIG. 6 is an explanatory diagram illustrating an example of a radio frame in which a PRACH is located. A timing of the radio frame with which the PRACH is transmitted is illustrated as the timing of the PRACH in FIG. 6. For example, when the PRACH configuration index is 0, the PRACH is located in the radio frames in which the SFN is even. That is, the PRACH is present at intervals of 20 ms. As illustrated in FIG. 6, for example, when the paging period is 320 ms (that is, 32 radio frames), the PRACH is located in 16 radio frames during one paging period.

As another specific example, for example, when the PRACH configuration index is 55, the PRACH is located in each radio frame.

Second, the PRACH configuration index designates the subframe (that is, the subframe with which the PRACH preamble can be transmitted) in which the PRACH is located. For example, any one of preamble formats 0 to 4 corresponds to the PRACH configuration index. For example, in preamble formats 0 to 3, the PRACH configuration index designates a combination of the subframes with which the PRACH preamble can be transmitted. In preamble format 4 of TDD, the PRACH configuration index designates an uplink pilot time slot (UpPTS) in the special subframe as a timing at which the PRACH preamble can be transmitted. Hereinafter, a specific example of the subframe in which the PRACH is located will be described with reference to FIG. 7.

Figure 7:
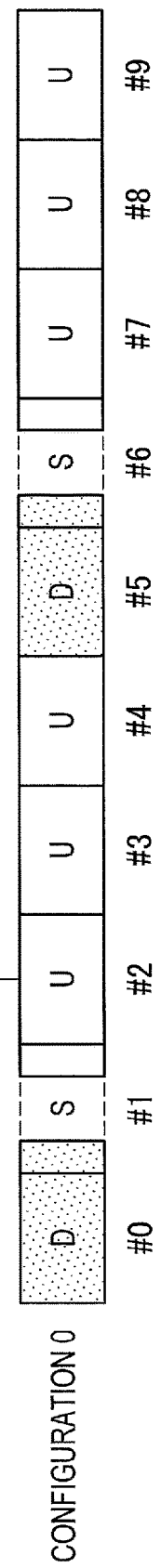
FIG. 7 is an explanatory diagram illustrating an example of a subframe in which the PRACH is located.

FIG. 7 is an explanatory diagram illustrating an example of the subframe in which the PRACH is located. TDD configuration 0 is illustrated in FIG. 7. For example, when the TDD configuration is configuration 0 and the PRACH configuration index is 0, the PRACH is located in subframe #2 in the radio frame. That is, the PRACH preamble can be transmitted with subframe #2.

As still another specific example, for example, when the PRACH configuration index is 55, the preamble format is the preamble format 4 and the PRACH is located in the UpPTS in the special subframe. That is, the PRACH preamble can be transmitted with the UpPTS.

For example, even when the terminal device performs MTC, the terminal device is assumed to attempt to perform connection to a base station at any timing in a request of an operation system, application software, or the like. That is, the terminal device performing the MTC is assumed to transmit the PRACH preamble.

(System information)

Content of System Information

The system information includes various kinds of information regarding radio communication in a cell. For example, the system information in LTE includes a master information block (MIB) and various system information blocks (SIBs). Hereinafter, a specific example of this point will be described with reference to FIG. 8.

Figure 8:
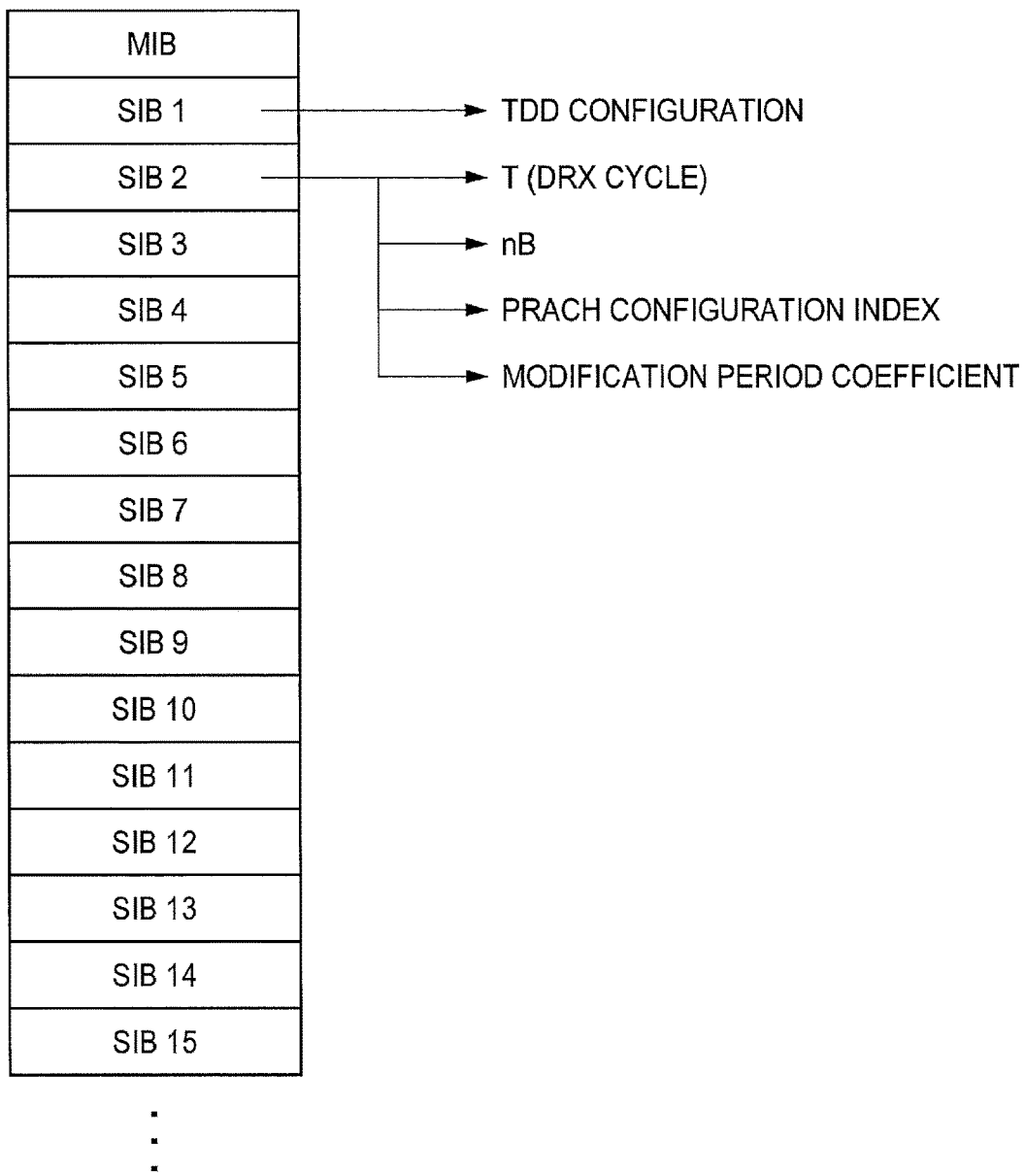
FIG. 8 is an explanatory diagram illustrating an example of information blocks included in system information.

FIG. 8 is an explanatory diagram illustrating an example of the information blocks included in the system information. In FIG. 8, one MIB and the plurality of SIBs are illustrated as the system information. As a specific example, SIB 1 of the plurality of SIBs includes, for example, information regarding the TDD configuration. SIB 2 of the plurality of SIBs includes a paging period (or DRX cycle) T and a parameter nB for deciding the paging occasion of each terminal device, and a PRACH configuration index for deciding a timing of random access. SIB 2 further includes a modification period coefficient for deciding a modification timing of the system information.

The MIB and the various SIBs are transmitted at respective periods. The MIB is transmitted on a Physical Broadcast CHannel (PBCH) arranged at a fixed position in a frequency direction and a time direction. SIB 1 is transmitted with the radio resources designated by the MIB and located at a position in the frequency direction and the time direction. The remaining SIBS are transmitted with the radio resources designated by SIB 1.

Modification of System Information

When the system information is modified, the system information is modified at a pre-decided timing. Specifically, the system information can be modified at each system information modification period. The system information modification period is obtained by multiplying the DRX cycle (that is, the paging period T) by the modification period coefficient included in SIB 2. When the system information is modified, notification of the modification of the system information is given before the system information after the modification is transmitted. Hereinafter, specific content of a timing of the notification of the modification of the system information and a timing of the modification of the system information will be described with reference to FIG. 9.

Figure 9:
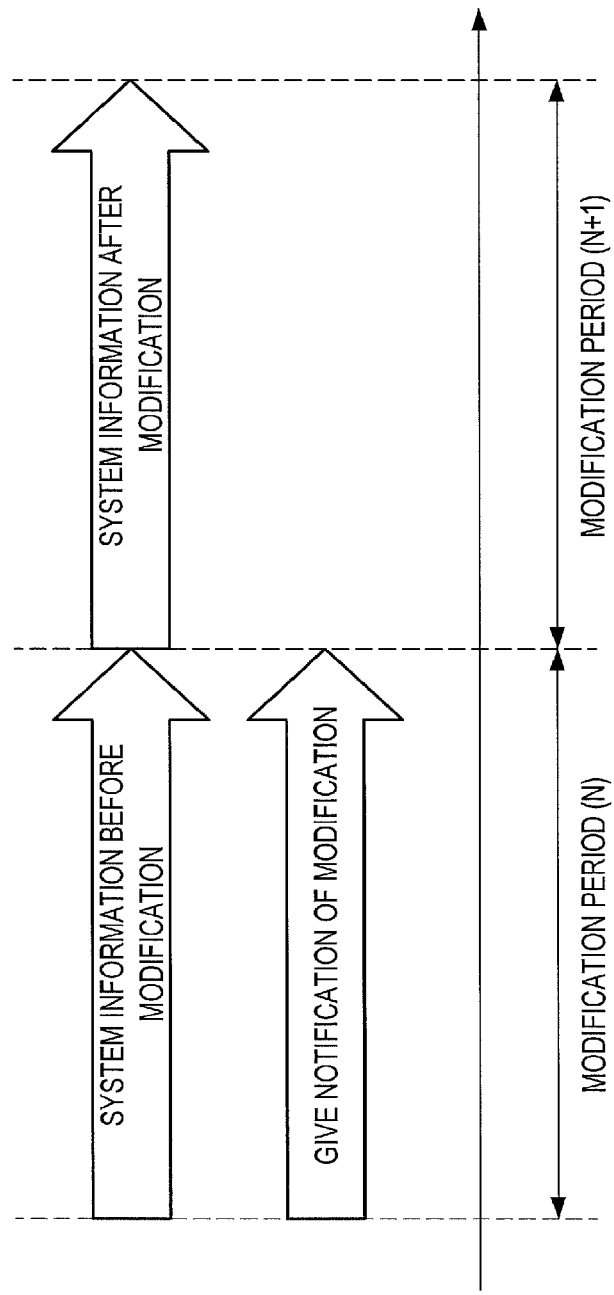
FIG. 9 is an explanatory diagram illustrating a timing of notification of modification of the system information and a timing of the modification of the system information.

FIG. 9 is an explanatory diagram illustrating the timing of the notification of the modification of the system information and the timing of the modification of the system information. In FIG. 9, two modification periods (N) and a system modification period (N+1) are illustrated for the system information. For example, when the system information is modified, the notification of the modification of the system information is given through paging during the modification period (N). During the modification period (N), the system information before the modification is transmitted. After the notification of the modification of the system information is given during the modification period (N), the system information after the modification is transmitted by the base station during the modification period (N+1). Then, as soon as the modification period (N+1) starts, the terminal device acquires the information block after the modification at a timing at which each information block of the system information is transmitted. The terminal device uses the system information before the modification until the terminal device acquires the system information after the modification.

2. SCHEMATIC CONFIGURATION OF RADIO COMMUNICATION SYSTEM

Figure 10:
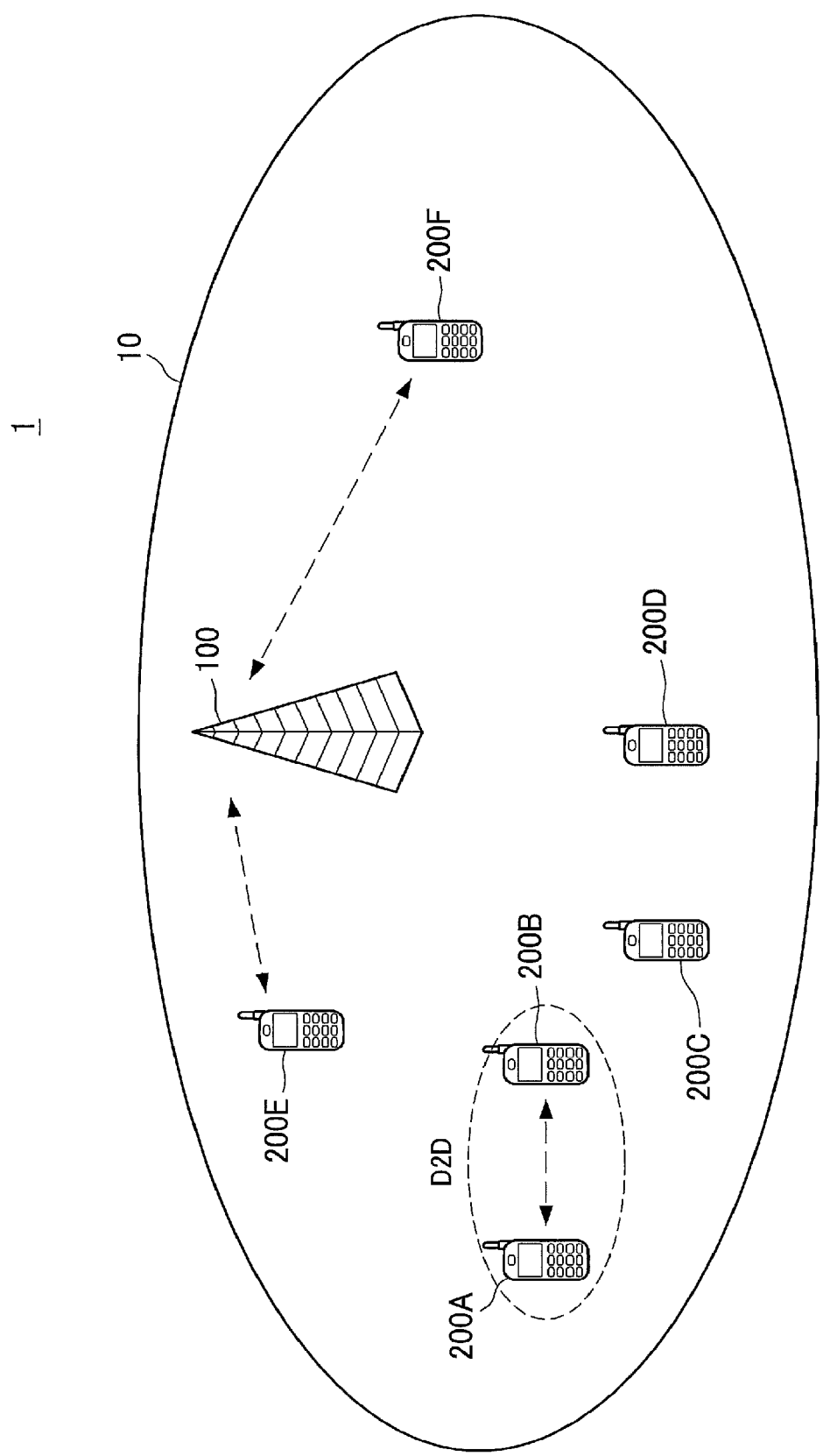
FIG. 10 is an explanatory diagram illustrating an example of a schematic configuration of a radio communication system 1 according to an embodiment.

Next, a schematic configuration of a radio communication system 1 according to the embodiment of the present disclosure will be described with reference to FIG. 10. FIG. 10 is an explanatory diagram illustrating an example of a schematic configuration of the radio communication system 1 according to the embodiment. Referring to FIG. 10, the radio communication system 1 includes a base station 100 and two or more terminal devices 200. The radio communication system 1 adopts, for example, LTE as a communication scheme of cellular communication. For example, TDD is adopted in the radio communication system 1.

(Base Station 100)

The base station 100 performs radio communication with the terminal devices 200 located within a cell 10. That is, the base station 100 transmits user data or control information to the terminal devices 100 in a downlink manner and receives user data or control information from the terminal devices 200 in an uplink manner.

For example, the base station 100 transmits the system information. More specifically, for example, the base station 100 transmits the MIB on the PBCH. The base station 100 transmits SIB 1 with the radio resources designated by the MIB and transmits the remaining SIBs with the radio resources designated by SIB 1. For example, as described above, SIB 1 includes the information regarding the TDD configuration. SIB 2 includes the paging period (or DRX cycle) T and the parameter nB for deciding the paging occasion of each terminal device 200, and the PRACH configuration index for deciding a timing of random access. SIB 2 further includes the modification period coefficient for deciding a modification timing of the system information.

For example, the base station 100 performs the paging. More specifically, for example, the base station 100 performs the paging to the UE at a timing according to each UE at the paging period. The base station 100 notifies the terminal device 200 of presence or absence of the call to the terminal device, presence or absence of the modification of the system information, or the like through paging.

For example, the base station 100 performs the procedure of the random access with the terminal device 100. More specifically, for example, the base station 100 receives the PRACH preamble from the terminal device 200 with the PRACH.

In particular, in the embodiment, the base station 100 decides the radio resources available for the D2D communication within the cell 10. Then, the base station 100 notifies the terminal devices 200 of the radio resources.

(Terminal Device 200)

The terminal device 200 performs the radio communication with the base station 100 when the terminal device 200 is located within the cell 10 formed by the base station 100. That is, the terminal device 200 receives the user data or the control information from the base station 100 in the downlink manner and transmits the user data or the control information to the base station 100 in the uplink manner.

For example, the terminal device 200 receives the system information transmitted by the base station 100 to acquire the system information.

Specifically, for example, the terminal device 200 acquires SIB 1. Then, the terminal device 200 recognizes the TDD configuration from SIB 1. Then, the terminal device 200 receives downlink data and transmits uplink data according to the TDD configuration.

For example, the terminal device 200 acquires SIB 2. Then, the terminal device 200 recognizes the paging period (or the DRX cycle) T and the parameter nB from SIB 2. Then, the terminal device 200 specifies the subframe which is the paging occasion of the self-device from the paging period T and the parameter nB and receives a paging message with the subframe.

For example, the terminal device 200 recognizes the timing of the PRACH from SIB 2. Then, the terminal device 200 transmits the PRACH preamble on the PRACH when the idle mode of the radio resource control (RRC) transitions to the connection mode of the RRC.

In particular, in the embodiment, the terminal device 200 performs the D2D communication with another terminal device 200. For example, the terminal device 200 performs the D2D communication using the radio resources, the notification of which is given by the base station 100. Referring back to FIG. 10, for example, the terminal devices 200A and 200B perform the D2D communication. For example, the D2D communication is performed according to Orthogonal Frequency-Division Multiplexing (OFDM).

The example of the configuration of the radio communication system 1 according to the embodiment of the present disclosure has been described above with reference to FIG. 10. In the embodiment, by allowing the terminal device 200 in the idle mode of the cellular communication to use the radio resources admitted in the D2D communication, it is possible to suppress an error in inter-device communication. Hereinafter, the specific content will be described in <<2.

Configuration of base station>>, <<4. Configuration of terminal device>>, <<5. Flow of process>>, and <<6. Modification example>>.

3. CONFIGURATION OF BASE STATION

Figure 11:
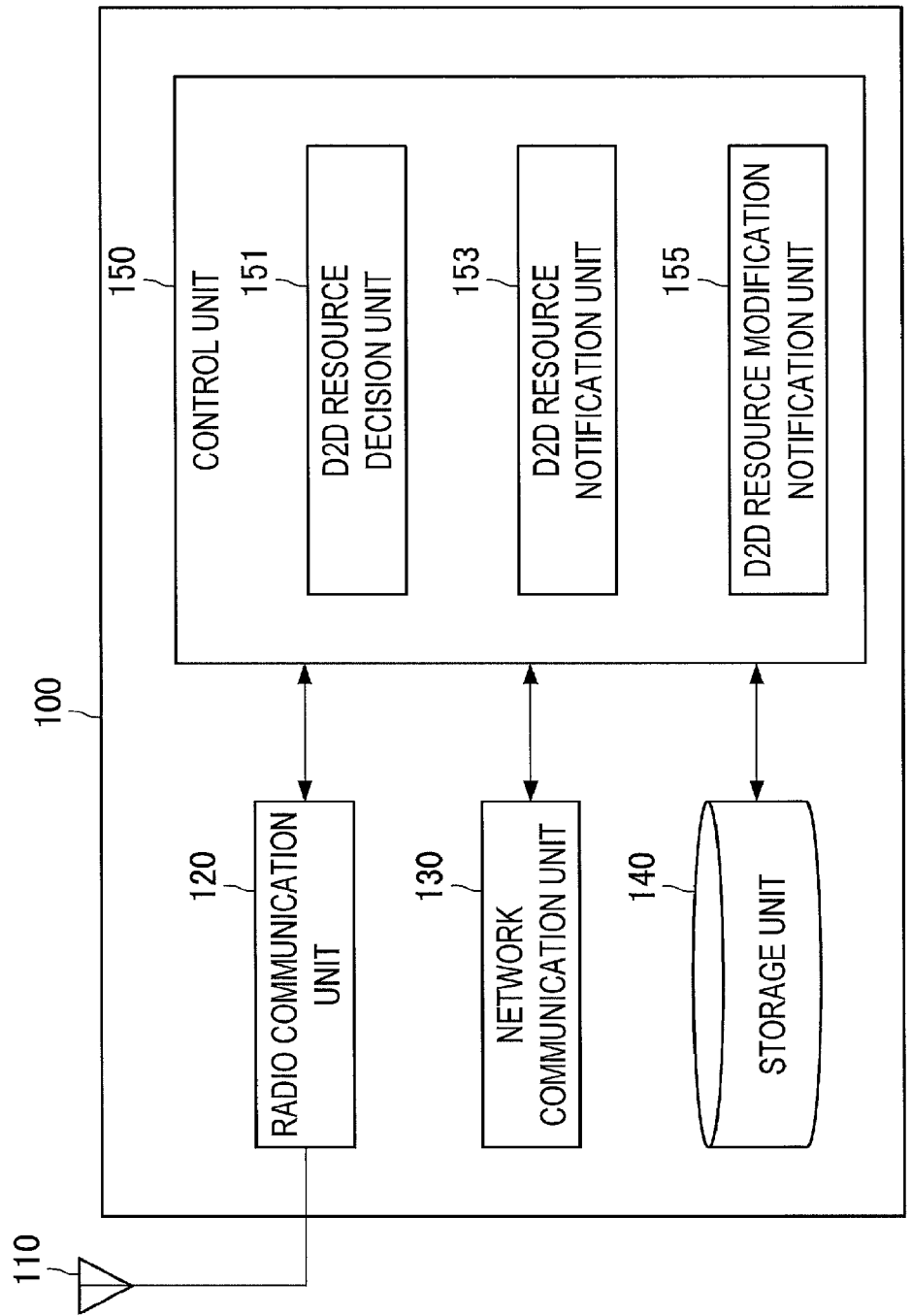
FIG. 11 is a block diagram illustrating an example of the configuration of a base station according to the embodiment.

Next, an example of the configuration of the base station 100 according to the embodiment will be described with reference to FIGS. 11 to 15. FIG. 11 is a block diagram illustrating an example of the configuration of the base station 100 according to the embodiment. Referring to FIG. 11, the base station 100 includes an antenna unit 110, a radio communication unit 120, a network communication unit 130, a storage unit 140, and a control unit 150.
(Antenna Unit 110)
The antenna unit 110 receives a radio signal and outputs the received radio signal to the radio communication unit 120. The antenna unit 110 transmits a transmission signal output by the radio communication unit 120.
(Radio Communication Unit 120)
The radio communication unit 120 performs the radio communication with the terminal devices 200 located within the cell 10.
(Network Communication Unit 130)
The network communication unit 130 communicates with other communication nodes. For example, the network communication unit 130 communicates with another base station 100, a Mobility Management Entity (MME), and the like.
(Storage Unit 140)
The storage unit 140 stores a program and data used for an operation of the base station 100.
(Control Unit 15)
The control unit 150 supplies various functions of the base station 100. The control unit 150 includes a D2D resource decision unit 151, a D2D resource notification unit 153, and a D2D resource modification notification unit 155.
(D2D Resource Decision Unit 151)
The D2D resource decision unit 151 decides the radio resources available for the D2D communication within the cell 10.

For example, the D2D resource decision unit 151 decides the radio resources (hereinafter, "D2D resources") available for the D2D communication within the cell 10 based on information regarding specific radio resources used by the terminal devices 200 in the idle mode in the radio resource control. More specifically, for example, the D2D resource decision unit 151 decides any radio resources excluding the specific radio resources as the D2D resources. Hereinafter, a specific example of the specific radio resources will be described.

First Example of Specific Radio Resources to be Excluded: Radio Resources for Paging As a first example, the specific radio resources include radio resources for paging. That is, the D2D resources are radio resources excluding the radio resources for paging.

For example, the radio resources for paging are radio resources used for the paging on all of the terminal devices 200 located within the cell 10. For example, as illustrated in FIG. 3 described above, when the parameter Ns used to decide the subframe for performing the paging is 2, the paging in regard to any of the terminal devices 200 can be performed in subframe #0 and subframe #5. Accordingly, the D2D resource decision unit 151 decides the radio resources of one of the subframes excluding subframe #0 and subframe #5 as the D2D resources.

Thus, the radio resources for paging are not decided as the D2D resources, and thus the terminal devices 200 do not perform the D2D communication using the radio resources for paging. As a result, the terminal devices 200 can be prevented from not receiving the paging message due to the D2D communication.

As another example, the radio resources for paging may be the radio resources used for the paging in regard to the terminal devices 200 performing the D2D communication within the cell 10. That is, the D2D resource decision unit 151 may decide any radio resources excluding the radio resources used for the paging in regard to the terminal devices 200 performing the D2D communication as the D2D resources.

In this case, for example, the base station 100 first recognizes the terminal devices 200 performing the D2D communication. For example, the terminal devices 200 performing the D2D communication notify the base station 100 of the D2D communication when the terminal devices 200 perform the D2D communication, and the D2D resource decision unit 151 recognizes the terminal devices 200 performing the D2D communication. Then, the D2D resource decision unit 151 calculates the paging occasion in regard to each terminal device 200 performing the D2D communication. The D2D resource decision unit 151 may decide any radio resources excluding the radio resources of the paging occasion as the D2D resources. Hereinafter, a specific example of this point will be described with reference to FIG. 12.

Figure 12:
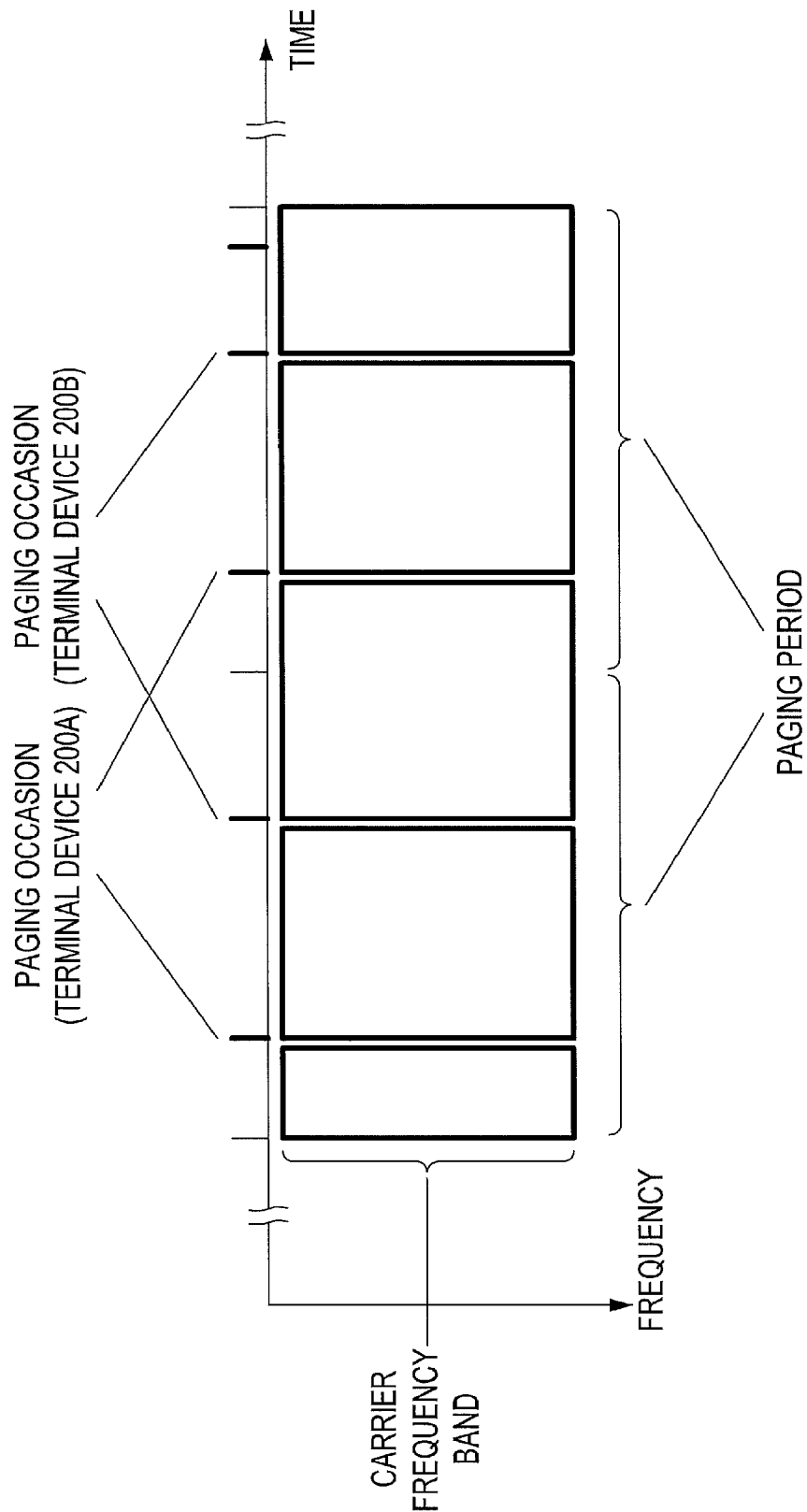
FIG. 12 is an explanatory diagram illustrating an example of radio resources (radio resources for paging in regard to terminal devices 200 performing D2D communication) not admitted as D2D resources.

FIG. 12 is an explanatory diagram illustrating an example of radio resources (the radio resources for paging in regard to the terminal devices 200 performing D2D communication) not admitted as the D2D resources. In FIG. 12, the paging occasions of the terminal devices 200A and 200B performing the D2D communication illustrated in FIG. 10 are illustrated in the time direction. Thus, for example, when only the terminal devices 200A and 200B perform the D2D communication in the cell 10, the D2D resource decision unit 151 decides any radio resources excluding the radio resources of the paging occasions as the D2D resources. Specifically, for example, the radio resources of the radio frame excluding a certain radio frame can be decided as the D2D resources.

Thus, when only the radio resources for paging in regard to the terminal devices 200 actually performing the D2D communication are excluded from a target of the D2D resources rather than all of the radio resources for paging, more radio resources can be admitted as the D2D resources. As a result, off-loading in regard to more traffic can be realized. That is, it is possible to suppress consumption of the radio resources and processing loads in an RAN.

Second Example of Specific Radio Resources to be Excluded: Radio Resources for Random Access As a second example, the specific radio resources include radio resources used in the random access procedure for transition to the connection mode of the radio resource control. That is, the D2D resources are resources excluding the radio resources used in the random access procedure.

For example, the radio resources used in the random access procedure are radio resources of the Physical Random Access CHannel (PRACH). That is, the D2D resources are radio resources other than the radio resources of the PRACH. Hereinafter, a specific example of this point will be described with reference to FIG. 13.

Figure 13:
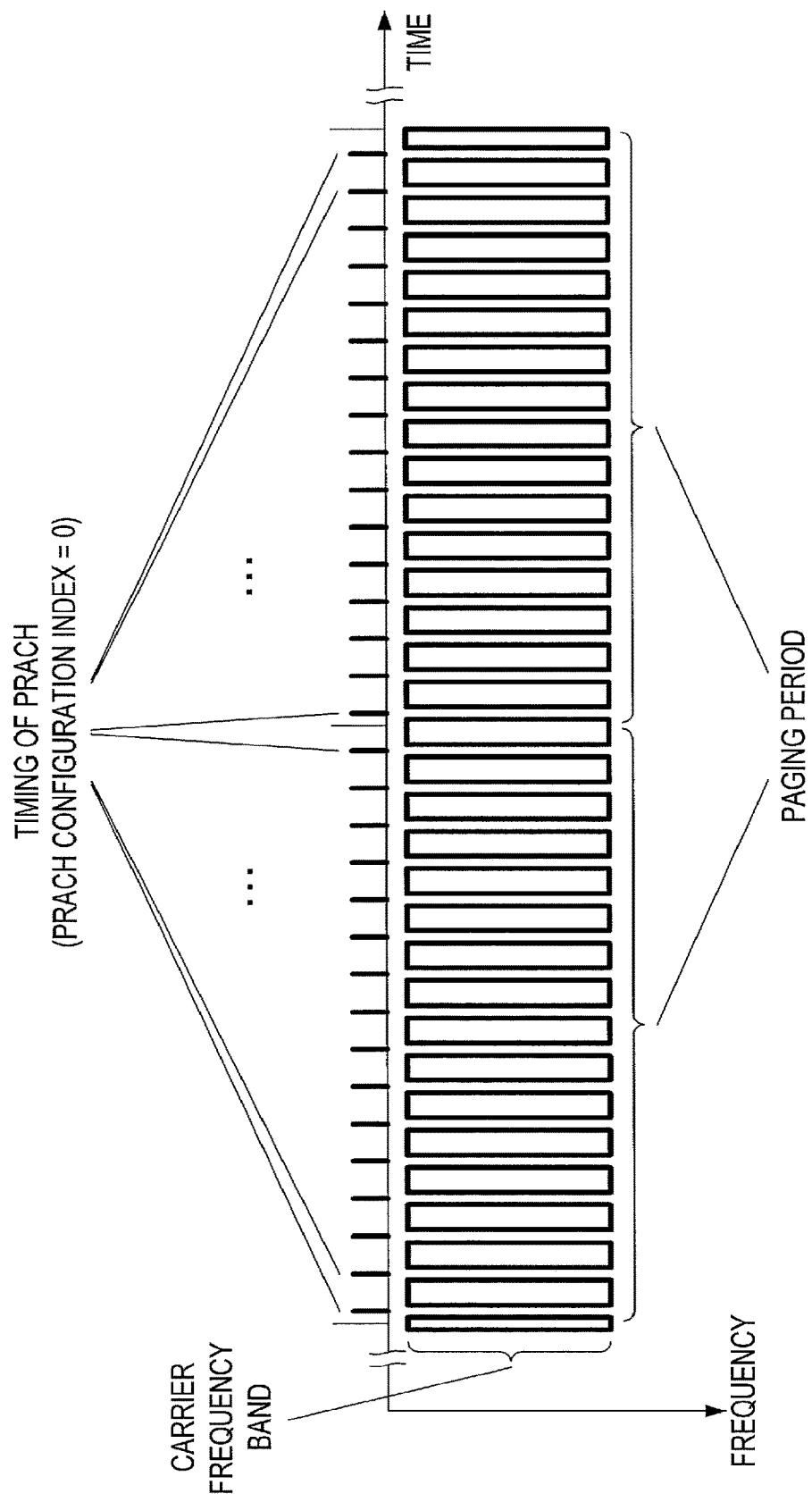
FIG. 13 is an explanatory diagram illustrating an example of radio resources (radio resources of the PRACH) not admitted as the D2D resources.

FIG. 13 is an explanatory diagram illustrating an example of radio resources (the radio resources of the PRACH) not admitted as the D2D resources. In FIG. 12, the timing of the PRACH when the PRACH configuration index is 0 is illustrated in the time direction, as in FIG. 6. For example, thus, the PRACH is located in the radio frames in which the SFN is even. Thus, when the PRACH is arranged, the D2D resource decision unit 151 decides any radio resources excluding the radio resources of the PRACH as the D2D resources. Specifically, for example, any radio resources of the radio frame among the radio frames in which the SFN is odd can be decided as the D2D resources. As illustrated in FIG. 7, when the PRACH configuration index is 0, the PRACH is present in subframe #2. Therefore, any radio resources of the subframe other than subframe #2 in the radio frame in which the SFN is even can also be decided as the D2D resources.

Thus, the radio resources used in the radio access procedure are not decided as the D2D resources, and thus the terminal devices 200 do not perform the D2D communication using the radio resources used in the random access procedure. As a result, it is possible to prevent the terminal devices 200 from not performing the random access procedure due to the D2D communication. As described above, in regard to the radio resources used in the random access procedure, when the D2D resources are the radio resources of the PRACH, the terminal devices 200 can be prevented from not transmitting the PRACH preamble due to the D2D communication.

As another example, the radio resources used in the random access procedure may be radio resources selected in advance as the radio resources used in the random access procedure by the terminal devices 200 performing the D2D communication. That is, when the radio resources used in the random access procedure other than the PRACH are selected in advance, the D2D resource decision unit 151 may decide any radio resources excluding the pre-selected radio resources as the D2D resources. The random access procedure includes not only transmission of the PRACH preamble by the terminal device 200 but also transmission of a random access response with the Physical Downlink Shared CHannel (PDSCH) by the base station 100 and transmission of Contention Resolution Identity (CRI).

Thus, when the radio resources for the random access procedure other than the radio resources of the PRACH are also excluded from the target of the D2D resources, the terminal device 200 does not perform the D2D communication using any radio resources for the random access procedure. As a result, the terminal device 200 can be prevented from not performing a part of the random access procedure due to the D2D communication. From another viewpoint, the terminal device 200 can perform the D2D communication without influencing the random access procedure until a process of the random access procedure is completed.

As described above, for example, any radio resources excluding specific radio resources (for example, the radio resources for paging or the radio resources for the random access procedure) used by the terminal device 200 in the idle mode of the radio resource control are decided as the D2D resources. Thus, when the terminal devices 200 are in the idle mode, the terminal devices 200 can perform the D2D communication without influencing cellular communication of the self-devices.

When the D2D communication is used for MTC, the D2D resources decided as described above are particularly effective. The MTC is autonomous communication between devices. As an example of the MTC, a device which is a measuring device transmits measurement data to a nearby device and the nearby device collects the measurement data. In the MTC, the size of data to be transmitted is small, a transmission frequency of data is low, and transmission delay of data is allowed. Further, low cost and low power consumption are necessary in the devices. Therefore, the devices used for the MTC preferably perform the D2D communication when communication circuits are shared between the cellular communication and the D2D communication and the devices are in the idle mode of the cellular communication. Accordingly, when the terminal devices 200 are the devices performing the MTC, the D2D resources decided as described above are particularly effective.

Specific Example of Decided D2D Resources

For example, the D2D resource decision unit 151 decides the radio resources of one subframe not including the specific radio resources as the radio resources available for the D2D communication. Hereinafter, a specific example of this point will be described with reference to FIG. 14.

FIG. 14 is an explanatory diagram illustrating an example of the decided D2D resources. In FIG. 14, a radio frame number and a subframe number are illustrated as the decided D2D resources. In this example, the radio resources of the subframe of which the subframe number is 3, 4, 7, 8 or 9 are decided as the D2D resources among the radio frames in which the SFN is not even (that is, the radio frames in which the SFN is odd).

As illustrated in FIG. 13, when the PRACH configuration index is 0, the PRACH is present in the radio frames in which the SFN is even. Therefore, since the D2D resources illustrated in FIG. 14 are the radio resources of the radio frames in which the SFN is odd, the D2D resources do not include the radio resources of the PRACH. Accordingly, the D2D communication with the D2D resources does not interfere with the transmission of the PRACH preamble.

As illustrated in FIG. 3, when the TDD configuration is configuration 0 and the parameter Ns=2, the paging occasion can be subframe #0 and subframe #5. Therefore, since the D2D resources illustrated in FIG. 14 do not include subframe #0 and subframe #5, the D2D resources do not include the radio resources of the subframe of the paging occasion. Accordingly, the D2D communication with the D2D resources does not interfere with the reception of the paging message.

Thus, by deciding the radio resources in units of subframes as the D2D resources, the D2D resources can be indicated as simple information. Accordingly, it is possible to suppress the radio resources used when the terminal device 100 is notified of the D2D resources. Since the D2D resources can be decided easily, the process of deciding the D2D resources can be further simplified. Since the radio resources available for the cellular communication and the radio resources used for the D2D communication are separated on the time axis, communication circuits (for example, RF circuits) can be shared between the cellular communication and the D2D communication.

For example, the decided D2D resources are used for the D2D communication by the terminal devices 200 in the idle mode of the radio resource control and are not used for the D2D communication by the terminal devices 200 in the connection mode of the radio resource control. In general, there is a possibility of the terminal device 200 in the connection mode receiving a downlink signal destined for the self-device with any subframe. Therefore, when the D2D communication is performed, the terminal device 200 may fail to receive the downlink signal. Therefore, only the terminal device 200 in the idle mode performs the D2D communication using the D2D resources, and thus it is possible to suppress the possibility of the D2D communication interfering with the cellular communication.

Modification of D2D Resources

The D2D resource decision unit 151 modifies the D2D resources as necessary. That is, the D2D resource decision unit 151 decides new D2D resources as necessary. For example, when the specific radio resources (for example, the radio resources for paging or the radio resources for the random access procedure) are modified, the D2D resource decision unit 151 decides new D2D resources.

In particular, in the embodiment, when the D2D resources are modified, the D2D resources before the modification are not used for the D2D communication after a predetermined timing and the D2D resources after the modification are used for the D2D communication after the predetermined timing. For example, there is no case where, when the terminal devices 200A and 200B perform the D2D communication, one of the terminal devices 200A and 200B uses the D2D resources before the modification and the other thereof uses the D2D resources after the modification.

Thus, the D2D resources used before and after the predetermined timing are switched, and thus it is possible to suppress an error in the D2D communication. That is, it is possible to avoid occurrence of an error in the D2D communication due to use of different D2D resources between the terminal devices 200 performing the D2D communication.

(D2D Resource Notification Unit 153)

The D2D resource notification unit 153 notifies the terminal device 200 located within the cell 10 of the D2D resources.

For example, the D2D resource notification unit 153 gives notification of the D2D resources in the system information of the cell 10. More specifically, for example, the D2D resource notification unit 153 generates the SIB including the information regarding the decided D2D resources. Then, the D2D resource notification unit 153 causes the radio communication unit 120 to transmit the SIB using the radio resources used to transmit the SIB.

For example, when the D2D resources are modified (that is, the new D2D resources are decided), the D2D resource notification unit 153 transmits the D2D resources after the modification. More specifically, for example, as illustrated in FIG. 9, the D2D resource notification unit 153 causes the radio communication unit 120 to transmit the system information before the modification during the modification period (N) of the system information and to transmit the system information after the modification during the modification period (N+1) of the system information.

Thus, by the notification of the D2D resources as the system information, the D2D resources after the modification can be used during the modification period (N+1) of the system information after a timing at which the SIB including the D2D resources is first received. The D2D resources before the modification are not used after this timing. Accordingly, since the D2D resources used before and after the timing are switched, it is possible to suppress an error in the D2D communication.

As described above, for example, the D2D resources are any radio resources excluding the specific radio resources (for example, the radio resources for paging or the radio resources for the random access procedure). The specific radio resources are modified with modification of the system information (for example, the paging period T and the parameter nB or the PRACH configuration index). Accordingly, when the D2D resources are transmitted in the system information, notification of the modified D2D resources can be given in a timely manner.

(D2D Resource Modification Notification Unit 155)

The D2D resource modification notification unit 155 gives notification of the modification of the D2D resources through the paging when the D2D resources are modified.

Thus, the notification of the modification of the D2D resources is given through the paging, and thus even the terminal devices 200 in the idle mode can be aware of the D2D resources. Accordingly, the terminal devices 200 in the idle mode can be allowed to use the radio resources admitted in the D2D communication.

For example, the D2D resource modification notification unit 155 gives the notification of the modification of the D2D resources as the modification of the system information through the paging. More specifically, for example, the D2D resource modification notification unit 155 gives the notification of the modification of the D2D resources by setting the flag of the system information modification in the paging message illustrated in FIGS. 4 to 1 and causing the radio communication unit 120 to transmit the paging message. For example, the D2D resource modification notification unit 155 causes the radio communication unit 120 to transmit the paging message during the modification period (N) of the system information, as illustrated in FIG. 9. Then, the system information after the modification including the information regarding the D2D resources after the modification is transmitted during the modification period (N+1) of the system information.

Thus, the notification of the modification of the D2D resources can be given without modification of the existing paging message.

The D2D resource modification notification unit 155 may give the notification of the modification of the D2D resources as modification different from the modification of the system information through the paging and may not give the notification of the modification of the D2D resources as the modification of the system information through the paging. Hereinafter, a specific example of this point will be described with reference to FIG. 15.

FIG. 15 is an explanatory diagram illustrating an example of information included in the paging message according to the embodiment. Referring to FIG. 15, the paging message includes, for example, a paging record list, a flag of system information modification, and a flag of ETWS indication, as in the example illustrated in FIG. 4. The paging message further includes a flag of D2D resource modification.

When the D2D resources are modified, the D2D resource modification notification unit 155 notifies the terminal devices 200 of the modification of the D2D resources by setting the flag of the D2D resource modification to 1. When the D2D resources are not modified, the D2D resource modification notification unit 155 notifies the terminal devices 200 of non-modification of the D2D resources by setting the flag of the D2D resource modification to 0. The D2D resource modification notification unit 155 decides the flag of the system information modification based on whether the system information other than the information regarding the D2D resources is modified. That is, the flag of the system information modification is not changed based on whether the D2D resources are modified.

Thus, it is possible to suppress a notification frequency of the modification of the system information while notifying the terminal devices 200 of the modification of the D2D resources. Accordingly, the terminal device 200 not performing the D2D communication can be prevented from needlessly searching for a portion changed in the system information.

4. CONFIGURATION OF TERMINAL DEVICE

Figure 16:
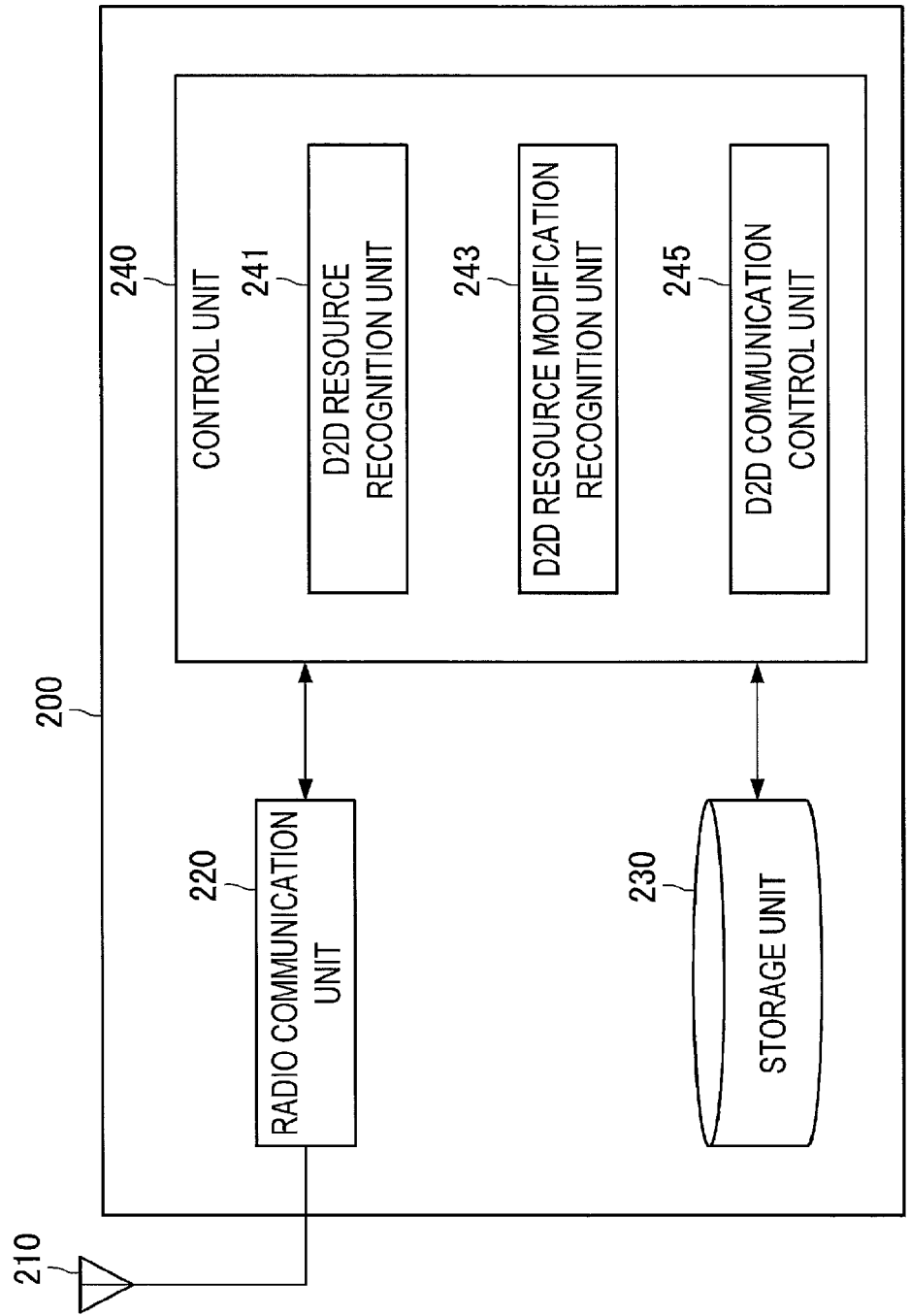
FIG. 16 is a block diagram illustrating an example of the configuration of the terminal device according to the embodiment.

Next, an example of the configuration of the terminal device 200 according to the embodiment will be described with reference to FIGS. 16 and 17. FIG. 16 is a block diagram illustrating an example of the configuration of the terminal device 200 according to the embodiment. Referring to FIG. 16, the terminal device 200 includes an antenna unit 210, a radio communication unit 220, a storage unit 230, and a control unit 240.

(Antenna Unit 210)

The antenna unit 210 receives a radio signal and outputs the received radio signal to the radio communication unit 220. The antenna unit 210 transmits a transmission signal output by the radio communication unit 220.

(Radio Communication Unit 220)

The radio communication unit 220 performs the radio communication with the base station 100 of the cell 10 when the terminal device 200 is located within the cell 10.

(Storage Unit 230)

The storage unit 230 stores a program and data used for an operation of the terminal device 200.

(Control Unit 240)

The control unit 240 supplies various functions of the terminal device 200. The control unit 240 includes a D2D resource recognition unit 241, a D2D resource modification recognition unit 243, and a D2D communication control unit 245.

(D2D Resource Recognition Unit 241)

The D2D resource recognition unit 241 recognizes the D2D resources when the D2D resources are decided and the notification of the D2D resources are given.

More specifically, for example, the notification of the D2D resources are given in the system information. In this case, when the radio communication unit 220 receives the SIB including the information regarding the D2D resources, the D2D resource recognition unit 241 recognizes the D2D resources from the SIB.

(D2D Resource Modification Recognition Unit 243)

When the D2D resources are modified and the notification of the modification of the D2D resources is given through the paging, the D2D resource modification recognition unit 243 recognizes the modification of the D2D resources.

More specifically, for example, as described above, the notification of the modification of the D2D resources is given as the modification of the system information through the paging. As illustrated in FIG. 9, the system information before the modification is transmitted during the modification period (N) of the system information and the system information after the modification is transmitted during the modification period (N+1) of the system information. In this case, the radio communication unit 220 receives the paging message during the modification period (N) of the system information. Then, the D2D resource modification recognition unit 243 recognizes the modification of the system information from the flag of the system information modification in the paging message. This operation has been described with reference to FIG. 5. The radio communication unit 220 receives the SIB including the information regarding the D2D resources during the modification period (N+1) of the system information. Then, the D2D resource modification recognition unit 243 acquires the information regarding the D2D resources from the SIB and recognizes the modification of the D2D resources.

The notification of the modification of the D2D resources may be given as the modification different from the modification of the system information through the paging and may not be given as the modification of the of the system information through the paging. In this case, when the paging message illustrated in FIG. 14 is transmitted during the modification period (N) of the system information, the D2D resource modification recognition unit 243 may recognize the modification of the D2D resources from the flag of the D2D resource modification in the paging message. Hereinafter, this operation will be described with reference to FIG. 17.

Figure 17:
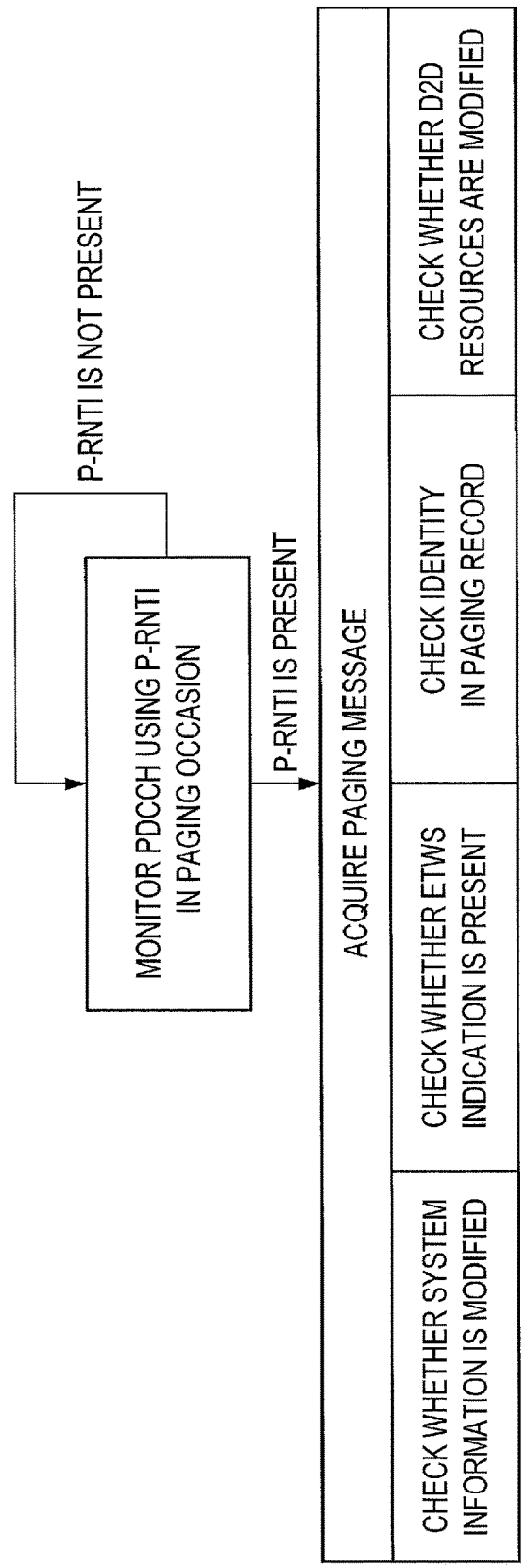
FIG. 17 is an explanatory diagram illustrating an example of an operation of the terminal device in regard to paging according to the embodiment.

FIG. 17 is an explanatory diagram illustrating an example of an operation of the terminal device in regard to the paging according to the embodiment. Referring to FIG. 17, the terminal device in the idle mode first monitors whether the P-RNTI is present in the PDCCH in the subframe of a predetermined paging occasion.

When the P-RNTI is present in the PDCCH in the subframe of the paging occasion, the paging message is included in the subframe. Accordingly, the D2D resource modification recognition unit 243 acquires the paging message. As described above, the paging message includes the paging record list, the flag of the system information modification, the flag of the ETWS indication, and the flag of the D2D resource modification. When the P-RNTI is not present in the PDCCH, the D2D resource modification recognition unit 243 monitors the PDCCH again in a subsequent paging occasion.

The D2D resource modification recognition unit 243 also checks, from the flag of the D2D resource modification, whether the D2D resources are modified when the paging message is acquired.

(D2D Communication Control Unit 245)

The D2D communication control unit 245 controls the D2D communication performed by the terminal device 200.

In particular, in the embodiment, the D2D communication control unit 245 controls the D2D communication so that the recognized D2D resources are used for the D2D communication. More specifically, for example, the D2D communication control unit 245 causes the radio communication unit 220 to perform the D2D communication using the D2D resources recognized by the D2D resource recognition unit 241.

In the embodiment, when the D2D resources are modified, the D2D communication control unit 245 controls the D2D communication such that the D2D resources before the modification are not used for the D2D communication after a predetermined timing and the D2D resources after the modification are used for the D2D communication after the predetermined timing. More specifically, for example, the notification of the D2D resources is given in the system information. When the D2D resources are modified, as described above, the D2D resource modification recognition unit 243 recognizes the modification of the D2D resources. In this case, the D2D communication control unit 245 causes the radio communication unit 220 to perform the D2D communication using the D2D resources before the modification until the modification of the D2D resources is recognized, and then causes the radio communication unit 220 to perform the D2D communication using the D2D resources after the modification after the modification of the D2D resources is recognized.

For example, when the terminal device 200 is in the RRC idle mode, the D2D communication control unit 245 performs the D2D communication using the D2D resources. When the terminal device 200 is in the RRC connection mode, the D2D communication control unit 245 does not perform the D2D communication using the D2D resources.

5. FLOW OF PROCESS

Next, an example of a communication control process according to the embodiment will be described with reference to FIGS. 18 to 20.

(Communication Control Process on Base Station Side)

Figure 18:
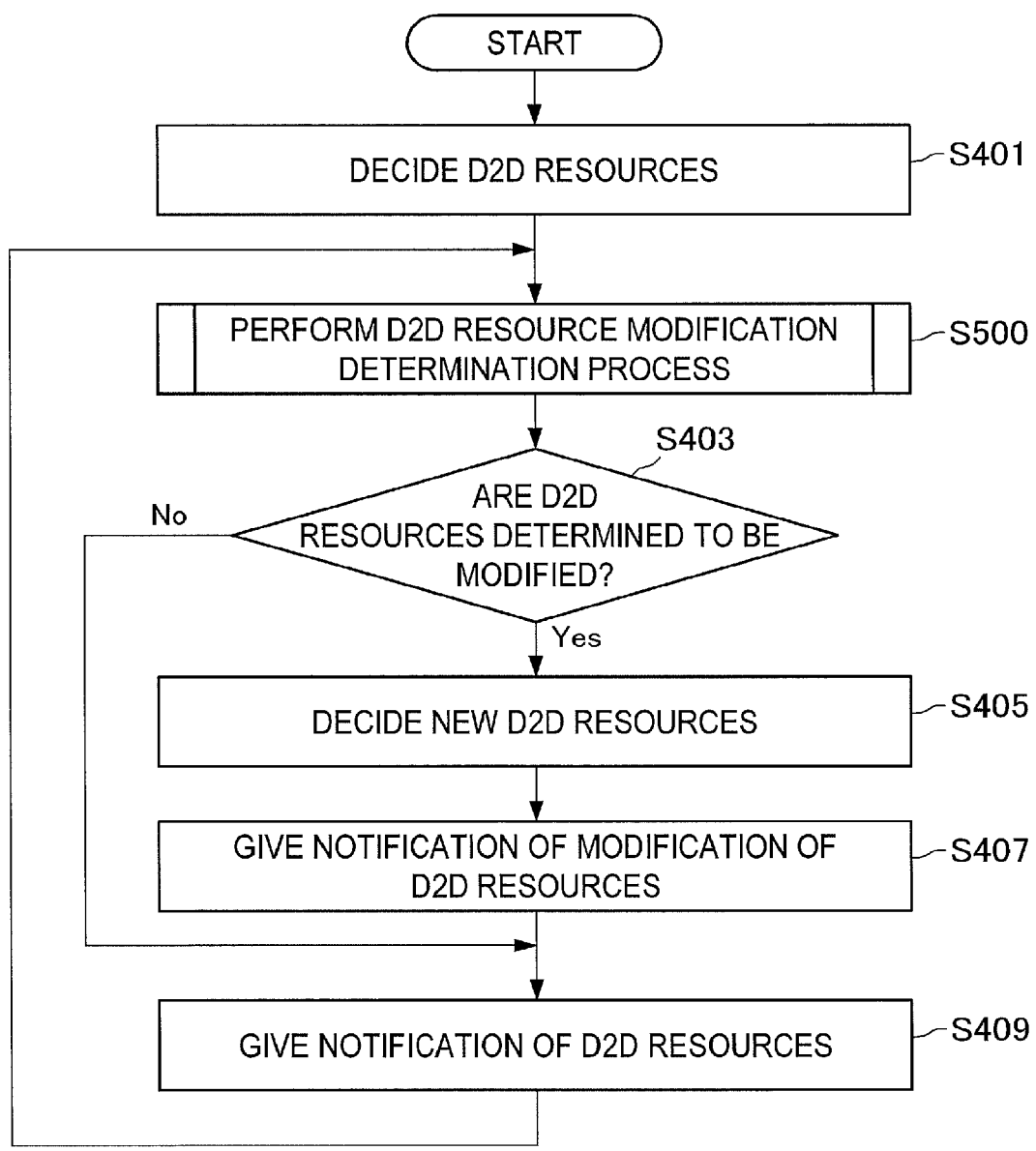
FIG. 18 is a flowchart illustrating an example of a schematic flow of a communication control process on a base station side according to the embodiment.

FIG. 18 is a flowchart illustrating an example of a schematic flow of the communication control process on the base station side according to the embodiment.

In step S401, the D2D resource decision unit 151 decides the radio resources (that is, the D2D resources) available for the D2D communication within the cell 10.

In step S500, the D2D resource decision unit 151 performs a D2D resource modification determination process. Then, when it is determined that the D2D resources are modified in the D2D resource modification determination process in step S403, the process proceeds to step S405. Otherwise, the process proceeds to step S409.

In step S405, the D2D resource decision unit 151 decides new D2D resources.

In step S407, the D2D resource modification notification unit 155 gives the notification of the modification of the D2D resources through the paging.

In step S409, the D2D resource notification unit 153 notifies the terminal devices 200 located within the cell 10 of the D2D resources. Then, the process returns to step S500.

D2D Resource Modification Determination Process

Figure 19:
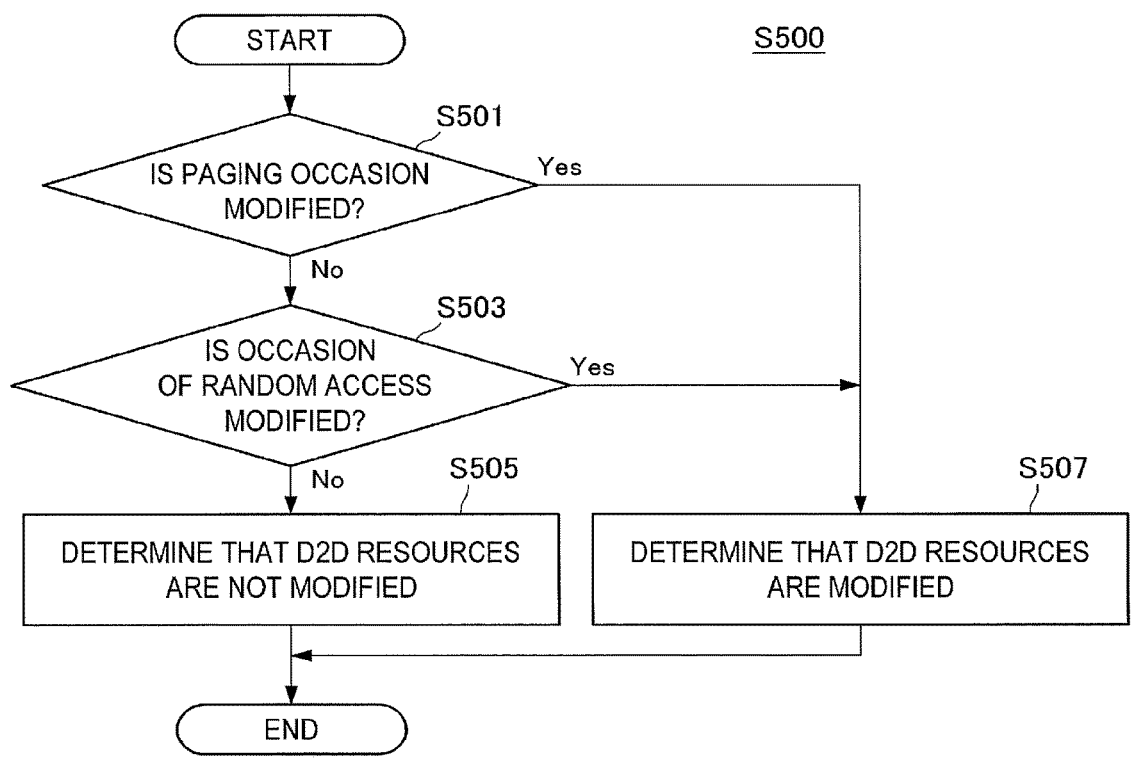
FIG. 19 is a flowchart illustrating an example of a schematic flow of a D2D resource modification determination process according to the embodiment.

FIG. 19 is a flowchart illustrating an example of a schematic flow of a D2D resource modification determination process according to the embodiment.

In step S501, the D2D resource decision unit 151 determines whether the paging occasion is modified. For example, based on whether the paging period T and the parameter nB are modified, the D2D resource decision unit 151 determines whether the paging occasion is modified. When the paging occasion is modified, the process proceeds to step S507. Otherwise, the process proceeds to step S503.

In step S503, the D2D resource decision unit 151 determines whether an occasion of random access (for example, the timing of the PRACH) is modified. For example, based on whether the PRACH configuration index is modified, the D2D resource decision unit 151 determines whether the timing of the PRACH is modified. When the occasion of the random access access is modified, the process proceeds to step S507. Otherwise, the process proceeds to step S505.

In step S505, the D2D resource decision unit 151 determines that the D2D resources are modified. Then, the process ends.

In step S507, the D2D resource decision unit 151 determines that the D2D resources are not modified. Then, the process ends.

(Communication Control Process on Terminal Device Side)

Figure 20:
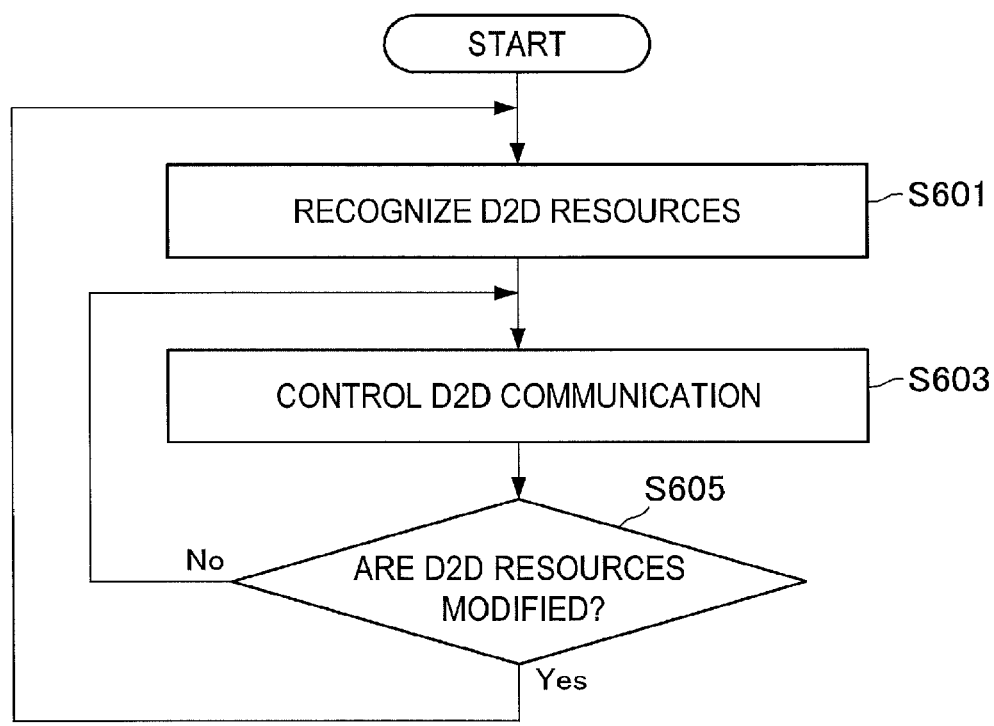
FIG. 20 is a flowchart illustrating an example of a schematic flow of a communication control process on the base station side according to the embodiment.

FIG. 20 is a flowchart illustrating an example of a schematic flow of a communication control process on the base station side according to the embodiment.

In step S601, the D2D resource recognition unit 241 recognizes the D2D resources. For example, the D2D resource recognition unit 241 recognizes the D2D resources from the SIB including the information regarding the D2D resources.

In step S603, the D2D communication control unit 245 controls the D2D communication performed by the terminal devices 200. More specifically, for example, the D2D communication control unit 245 controls the D2D communication so that the recognized D2D resources are used for the D2D communication.

In step S605, the D2D resource modification recognition unit 243 determines whether the D2D resources are modified. More specifically, for example, it is determined whether the D2D resources are modified based on the flag of the system information modification in the paging message and the information regarding the D2D resources in one SIB. When the D2D resources are modified, the process returns to step S601. Otherwise, the process returns to step S603.

6. MODIFICATION EXAMPLE

Next, a modification example of the embodiment will be described with reference to FIGS. 21 to 23.

<6.1. Overview>

First, an overview of a modification example of the base station 100 according to the embodiment will be described with reference to FIG. 21.

In the above-described embodiment, the D2D resources are decided as the common resources to the terminal devices 200 located within the cell 10. On the other hand, in a modification example of the embodiment, the D2D resources are decided for each group of the D2D communication. The decision of the D2D resources for each group can result in several advantages as follows.

First, more radio resources can be used for the D2D communication in the groups of the D2D communication. More specifically, the radio resources permitted to be used for the D2D communication may differ depending on a D2D group. For example, since the paging occasion differs depending on the terminal device 200, the radio resources for paging can differ depending on the D2D group. Accordingly, when the radio resources for the D2D communication are decided for each D2D group, the amount of radio resources to be excluded can be set to be smaller. As a result, more radio resources can be decided as the D2D resources in each group of the D2D communication, and thus more radio resources can be used.

Second, by deciding the D2D resources so that the D2D resources do not overlap between the groups of the D2D communication, it is possible to suppress interference between the groups of the D2D communication. Hereinafter, a specific example of this point will be described with reference to FIG. 21.

Figure 21:
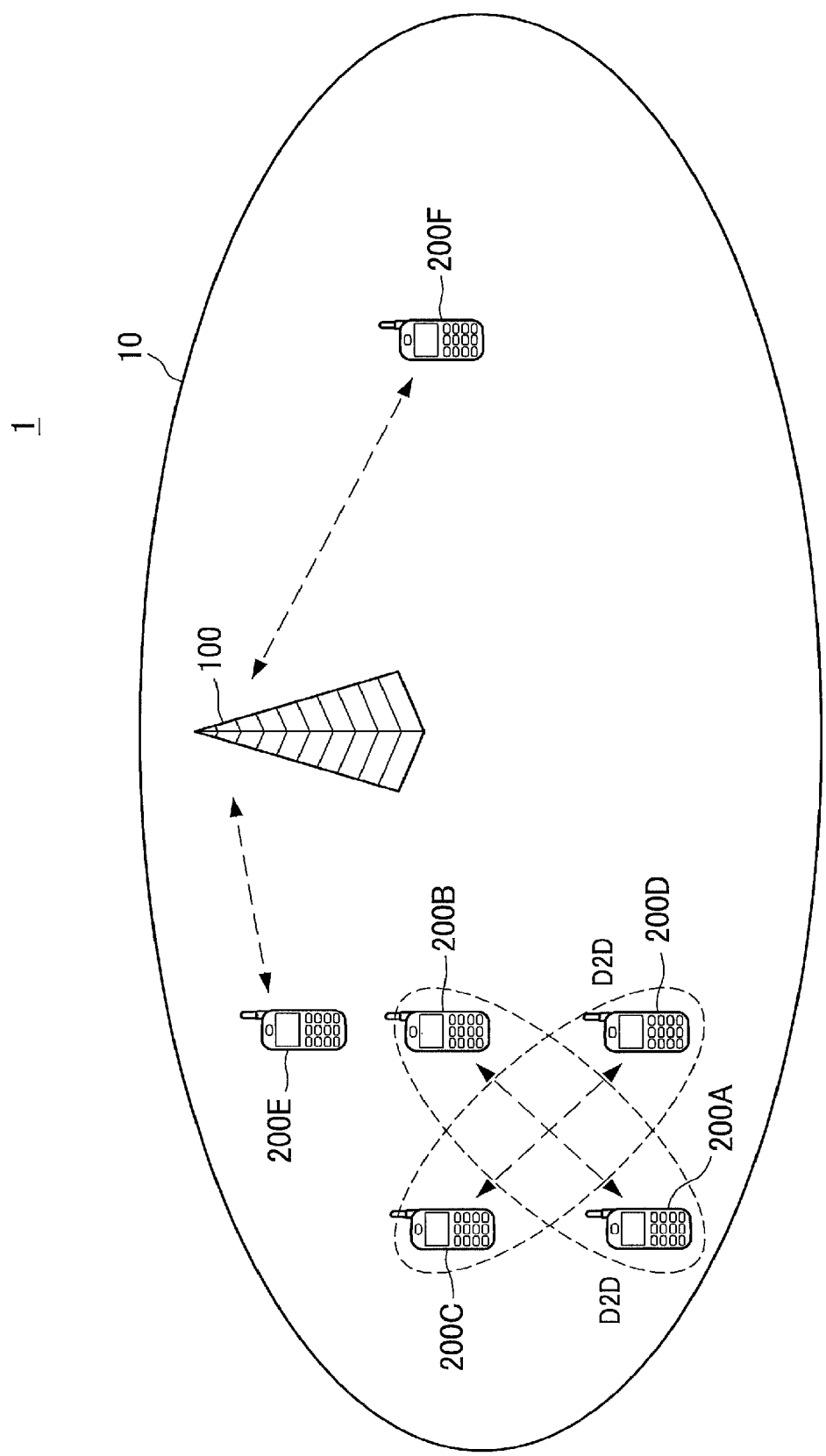
FIG. 21 is an explanatory diagram illustrating an example of interference between groups of D2D communication.

FIG. 21 is an explanatory diagram illustrating an example of the interference between the groups of D2D communication. Referring to FIG. 21, the terminal devices 200A and 200B perform the D2D communication in the radio communication system 1. That is, the terminal devices 200A and 200B form a group of the D2D communication. Further, terminal devices 200C and 200D perform the D2D communication. That is, the terminal devices 200C and 200D also form a group of the D2D communication. In this example, the group of the terminal devices 200A and 200B and the group of the terminal devices 200C and 200D are located near each other. Accordingly, interference can occur between the groups.

Thus, the interference can occur between the groups of the D2D communication. Accordingly, by deciding the radio resources available for the D2D communication for each group of the D2D communication so that the D2D resources do not overlap between the groups of the D2D communication, it is possible to suppress the interference between the groups of the D2D communication.

<6.2. Configuration of Base Station>

First, an example of the configuration of the base station 100 according to the modification example of the embodiment will be described with reference to FIG. 22. Here, only differences from the example of the configuration of the base station 100 according to the above-described embodiment or modifications from this example will be described.

(D2D Resource Decision Unit 151)

The D2D resource decision unit 151 decides the radio resources (that is, D2D resources) available for the D2D communication for each group of the D2D communication.

For example, the D2D resource decision unit 151 decides the D2D resources so that the D2D resources do not overlap between the groups of the D2D communication. More specifically, for example, the D2D resource decision unit 151 decides the D2D resources so that the D2D resources do not overlap between any groups of the D2D communication. Hereinafter, a specific example of this point will be described with reference to FIG. 22.

FIG. 22 is an explanatory diagram illustrating an example of the D2D resources decided for each group of the D2D communication. FIG. 22 illustrates the D2D resources of each group when 3 groups (groups A, B, and C) of the D2D communication are present. As in the example of FIG. 14, a radio frame number and a subframe number are illustrated as the D2D resources. In this example, the radio resources of a subframe in which the subframe number is 3 or 4 in the radio frames in which the SFN is not even (that is, the radio frames in which the SFN is odd) are decided as the D2D resources of the group A. The radio resources of a subframe in which the subframe number is 7 or 8 in the radio frames in which the SFN is not even are decided as the D2D resources of the group B. The radio resources of a subframe in which the subframe number is 9 in the radio frames in which the SFN is not even are decided as the D2D resources of the group C.

Thus, by deciding the D2D resources so that the D2D resources do not overlap between the groups of the D2D communication, as described above, it is possible to suppress the interference between the groups of the D2D communication.

The D2D resource decision unit 151 may decide the D2D resources so that the D2D resources do not overlap between a first group of the D2D communication and a second group of the D2D communication located near the first group. That is, when the groups of the D2D communication are located near each other, the D2D resources may not overlap between these groups, instead of overlapping between any groups of the D2D communication.

Specifically, for example, the D2D resource decision unit 151 recognizes the groups of the D2D communication located near each other. For example, the groups A and B are recognized. Thereafter, the D2D resource decision unit 151 decides the D2D resources of each of the groups A and B so that the D2D resources do not overlap between the groups A and B.

Thus, it is possible to suppress the interference between the groups of the D2D communication. Since the same radio resources can be used between the groups of the D2D communication which are not located near each other, more radio resources can be used for the D2D communication.

The D2D resource decision unit 151 can recognize the groups of the D2D communication located near each other as follows, for example. First, the D2D resource decision unit 151 estimates a distance between the base station 100 and the terminal device 200 from a timing advance value in regard to the terminal device 200 and estimates the direction of the terminal device 200 from the base station 100 based on a reception result of the antenna. Then, the D2D resource decision unit 151 recognizes the groups including the terminal devices 200 of which the distance and the direction are close as the groups of the D2D communication located near each other.

(D2D Resource Notification Unit 153)

The D2D resource notification unit 153 gives the notification of the D2D resources decided for each group of the D2D communication. More specifically, for example, the D2D resource notification unit 153 generates the SIB including the information regarding the D2D resources decided for each group of the D2D communication, as illustrated in FIG. 22. Then, the D2D resource notification unit 153 causes the radio communication unit 120 to transmit the SIB using the radio resources used to transmit the SIB.

<6.3. Flow of Process>

Next, an example of the communication control process according to the modification example of the embodiment will be described with reference to FIG. 23. A communication control process of the terminal device side is not different between the communication control process according to the above-described embodiment and the communication control process according to the modification. Accordingly, only the communication control process of the base station side will be described here.

Figure 23:
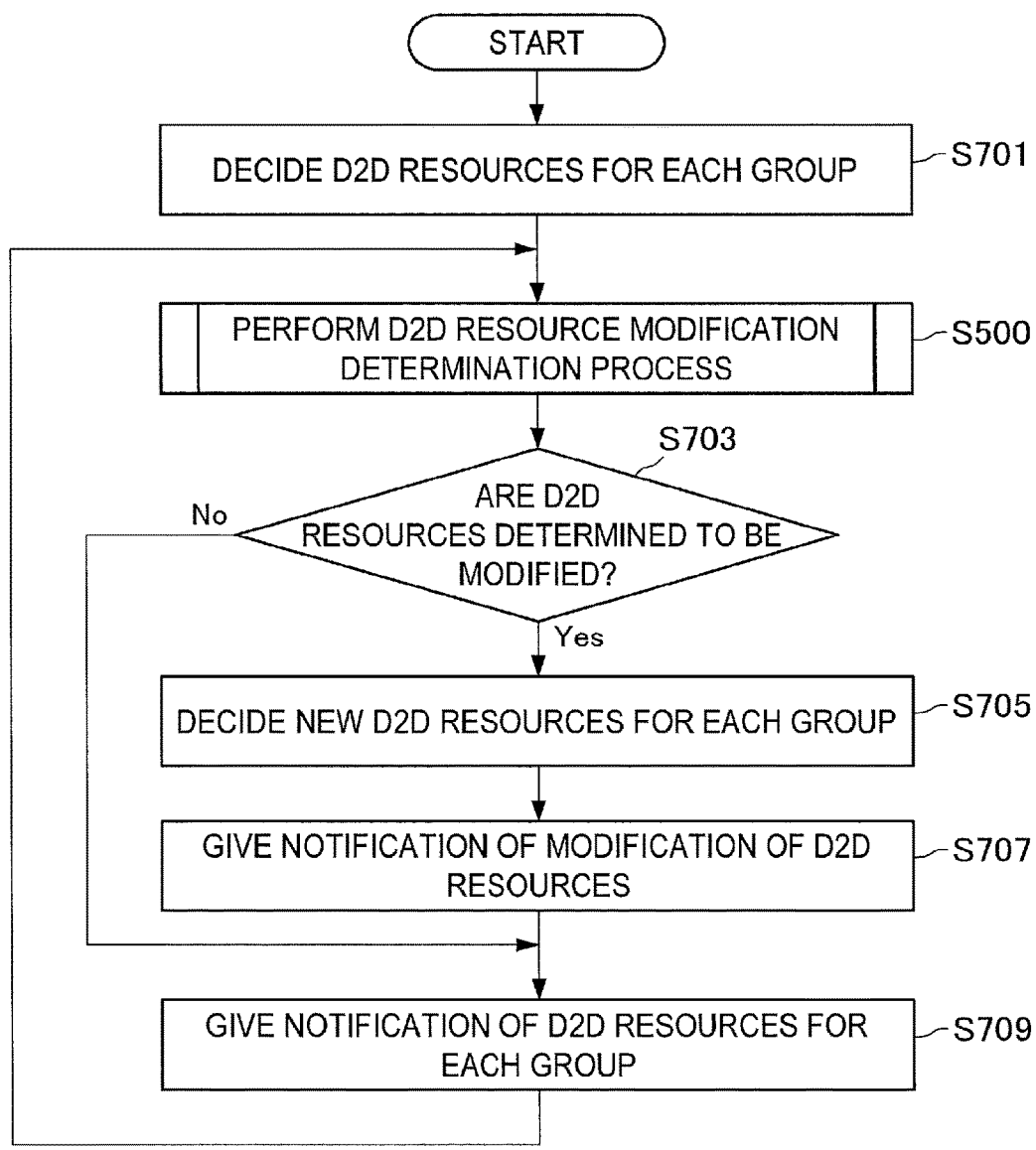
FIG. 23 is a flowchart illustrating an example of a schematic flow of a communication control process on a base station side according to a modification example of the embodiment.

FIG. 23 is a flowchart illustrating an example of a schematic flow of the communication control process on the base station side according to the modification example of the embodiment.

In step S701, the D2D resource decision unit 151 decides the radio resources (that is the D2D resources) available for the D2D communication for each group of the D2D communication.

In step S500, the D2D resource decision unit 151 performs the D2D resource modification determination process. Then, when the D2D resources are determined to be modified in the D2D resource modification determination process in step S703, the process proceeds to step S705. Otherwise, the process proceeds to step S709.

In step S705, the D2D resource decision unit 151 decides new D2D resources for each group of the D2D communication.

In step S707, the D2D resource modification notification unit 155 gives the notification of the modification of the D2D resources through the paging.

In step S709, the D2D resource notification unit 153 notifies the terminal devices 200 located within the cell 10 of the D2D resources of each group. Then, the process returns to step S500.

7. APPLICATION

The technology related to the present disclosure can be applied to various products. For example, the base station 100 may be realized as one kind of evolved NodeB (eNB) such as a macro eNB or a small eNB. The small eNB may be an eNB that covers a smaller cell, such as a pico eNB, a micro eNB, or a home (pemto) eNB, than a macro cell. Instead, the base station 100 may be realized as another kind of base station such as a NodeB or a base transceiver station (BTS). The base station 100 may include a main body (also referred to as a base station device) controlling radio communication and at least one remote radio head (RRH) disposed at a different location than the main body. The various kinds of terminals described below may perform a base station function temporarily or semi-permanently to operate as the base station 100.

The terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, the terminal device 200 may be a radio communication module mounted onboard these terminals (for example, an integrated circuit module configured on a single die).

<<4.1. Application Example of Base Station>>
(First Application)

Figure 24:
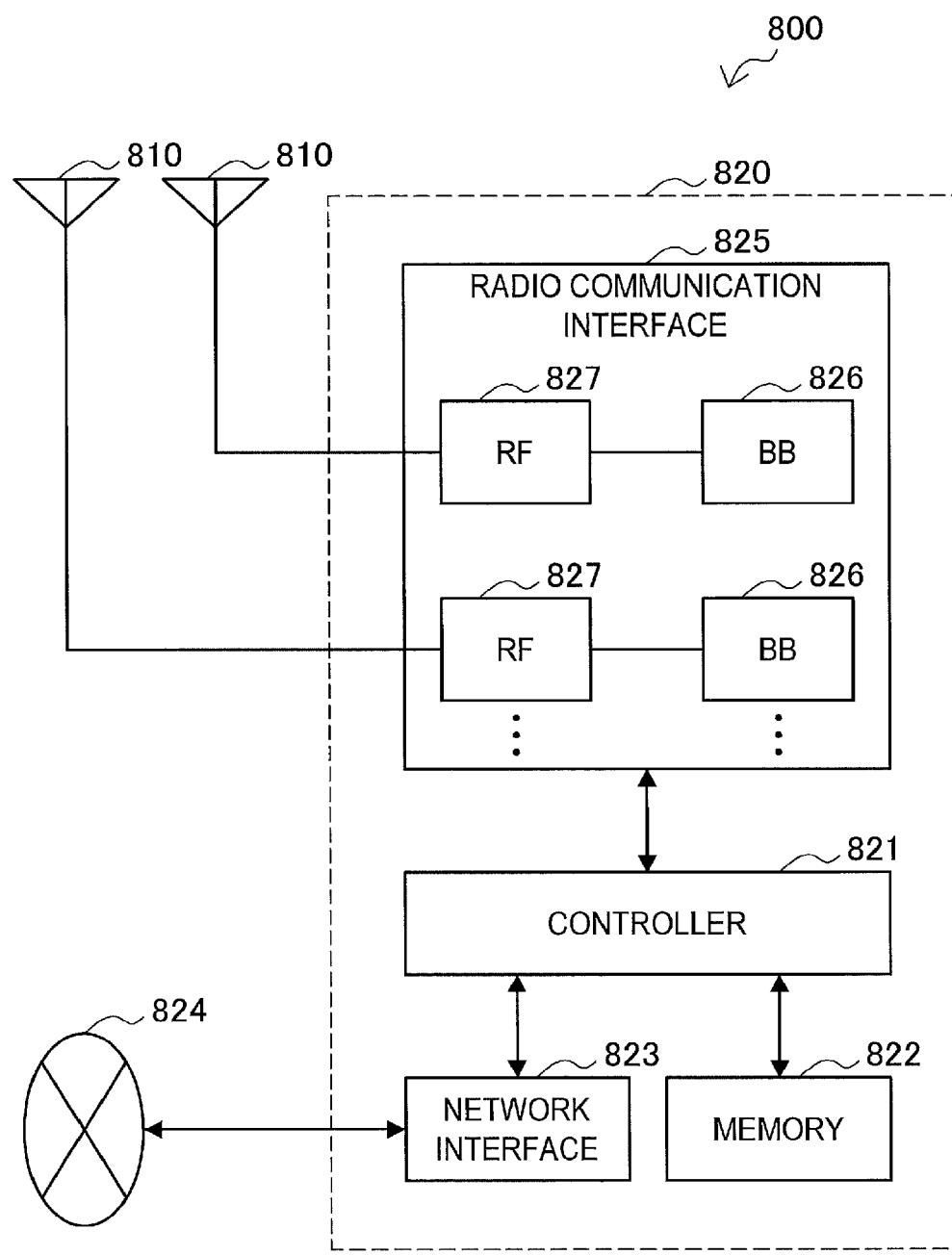
FIG. 24 is a block diagram illustrating a first example of a schematic configuration of an eNB to which the technology of the present disclosure may be applied.

FIG. 24 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNB 800 may include a plurality of antennas 810 as illustrated in FIG. 24, and the plurality of antennas 810 may respectively correspond to a plurality of frequency bands used by the eNB 800, for example. Note that although FIG. 24 illustrates an example of the eNB 800 including a plurality of antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from a plurality of baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include a plurality of BB processors 826 as illustrated in FIG. 24, and the plurality of BB processors 826 may respectively correspond to a plurality of frequency bands used by the eNB 800, for example. In addition, the radio communication interface 825 may also include a plurality of RF circuits 827 as illustrated in FIG. 24, and the plurality of RF circuits 827 may respectively correspond to a plurality of antenna elements, for example. Note that although FIG. 24 illustrates an example of the radio communication interface 825 including a plurality of BB processors 826 and a plurality of RF circuits 827, the radio communication interface 825 may also include a single BB processor 826 or a single RF circuit 827.

(Second Application)

Figure 25:
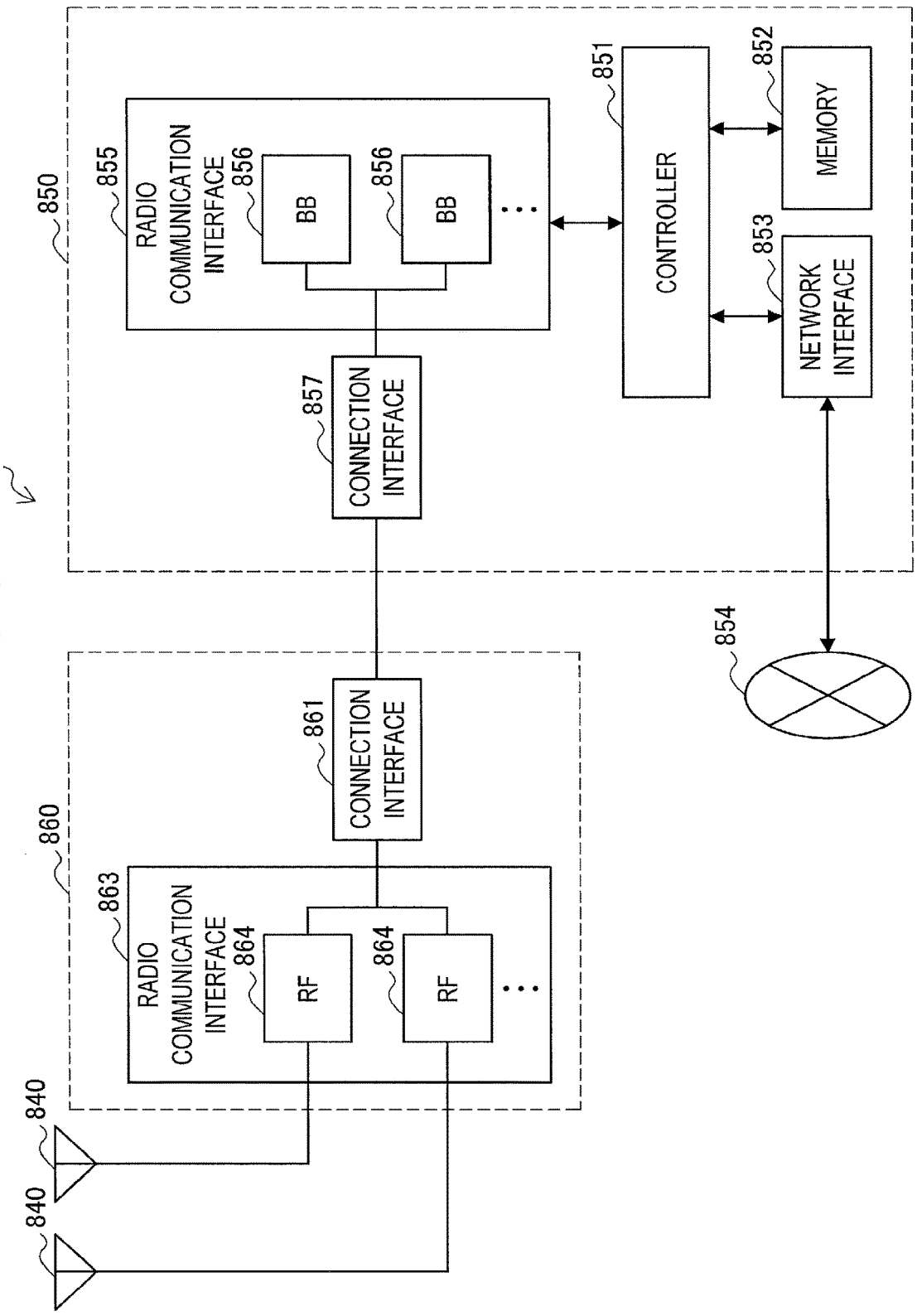
FIG. 25 is a block diagram illustrating a second example of a schematic configuration of an eNB to which the technology of the present disclosure may be applied.

FIG. 25 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNB 830 may include a plurality of antennas 840 as illustrated in FIG. 25, and the plurality of antennas 840 may respectively correspond to a plurality of frequency bands used by the eNB 830, for example. Note that although FIG. 25 illustrates an example of the eNB 830 including a plurality of antennas 840, the eNB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 24.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 24, except for being connected to an RF circuit 864 of the RRH 860 via the connection interface 857. The radio communication interface 855 may also include a plurality of BB processors 856 as illustrated in FIG. 25, and the plurality of BB processors 856 may respectively correspond to a plurality of frequency bands used by the eNB 830, for example. Note that although FIG. 25 illustrates an example of the radio communication interface 855 including a plurality of BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include a plurality of RF circuits 864 as illustrated in FIG. 25, and the plurality of RF circuits 864 may respectively correspond to a plurality of antenna elements, for example. Note that although FIG. 25 illustrates an example of the radio communication interface 863 including a plurality of RF circuits 864, the radio communication interface 863 may also include a single RF circuit 864.

In the eNB 800 and the eNB 830 illustrated in FIGS. 24 and 25, the D2D resource decision unit, the D2D resource notification unit, and the D2D resource modification notification unit described with reference to FIG. 11 may be implemented in the radio communication interface 825 as well as the radio communication interface 855 and/or the radio communication interface 863. Also, at least some of these functions may also be implemented in the controller 821 and the controller 851.

<<4.2. Application Example of Terminal Device>>
(First Application)

Figure 26:
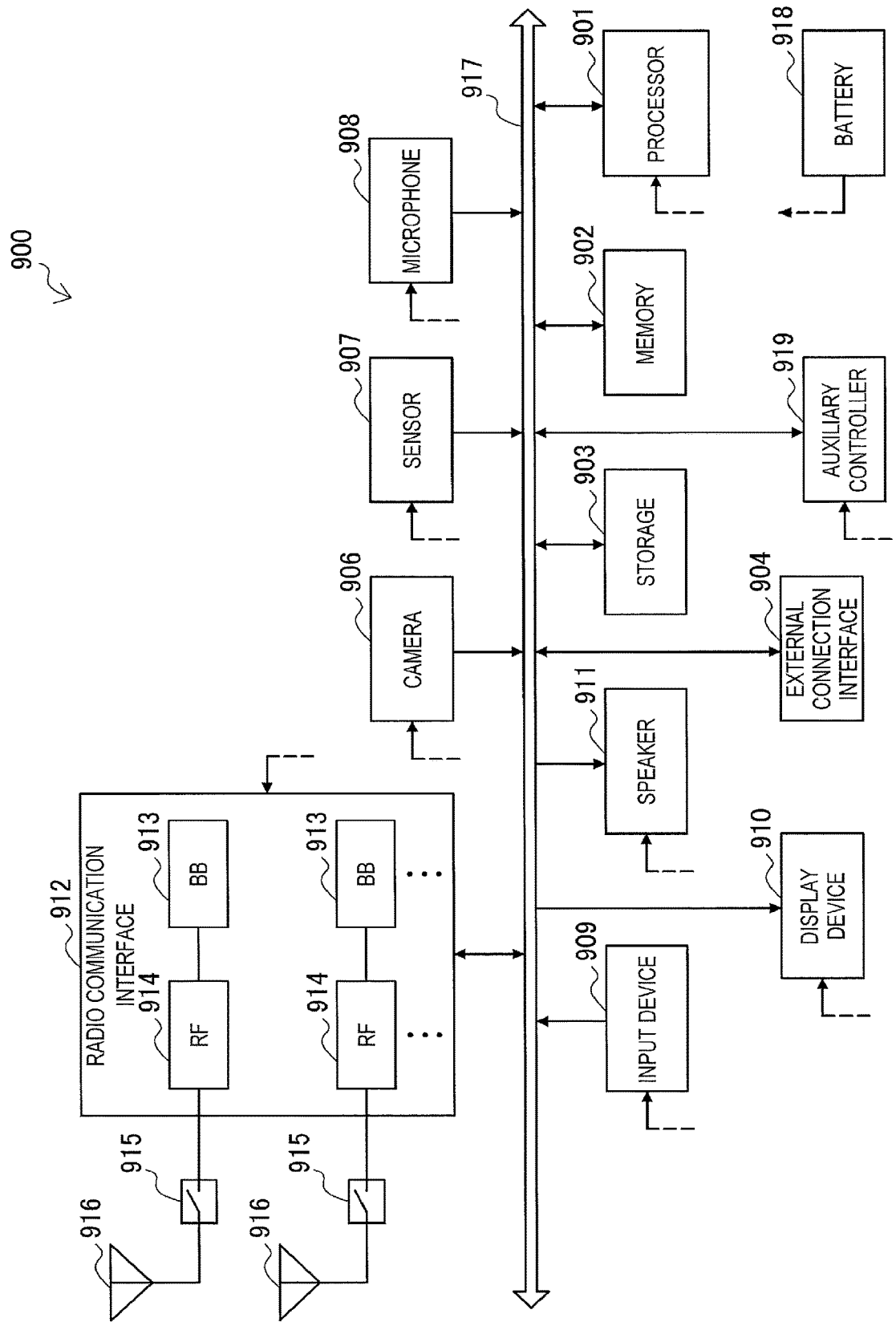
FIG. 26 is a block diagram illustrating an example of a schematic configuration of a smartphone to which technology according of the present disclosure may be applied.

FIG. 26 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include a plurality of BB processors 913 and a plurality of RF circuits 914 as illustrated in FIG. 26. Note that although FIG. 26 illustrates an example of the radio communication interface 912 including a plurality of BB processors 913 and a plurality of RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among a plurality of circuits included in the radio communication interface 912 (for example, circuits for different radio communication schemes).

Each antenna 916 includes a single or a plurality of antenna elements (for example, a plurality of antenna elements constituting a MIMO antenna), and is used by the radio communication interface 912 to transmit and receive radio signals. The smartphone 900 may also include a plurality of antennas 916 as illustrated in FIG. 26. Note that although FIG. 26 illustrates an example of the smartphone 900 including a plurality of antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 26 via power supply lines partially illustrated with dashed lines in the drawing. The auxiliary controller 919 causes minimal functions of the smartphone 900 to operate while in a sleep mode, for example.

In the smartphone 900 illustrated in FIG. 26, the D2D resource recognition unit 241, the D2D resource modification recognition unit 243, and the D2D communication control unit described with reference to FIG. 16 may be implemented in the radio communication interface 912. Also, at least some of these functions may also be implemented in the processor 901 or the auxiliary controller 919.

(Second Application)

Figure 27:
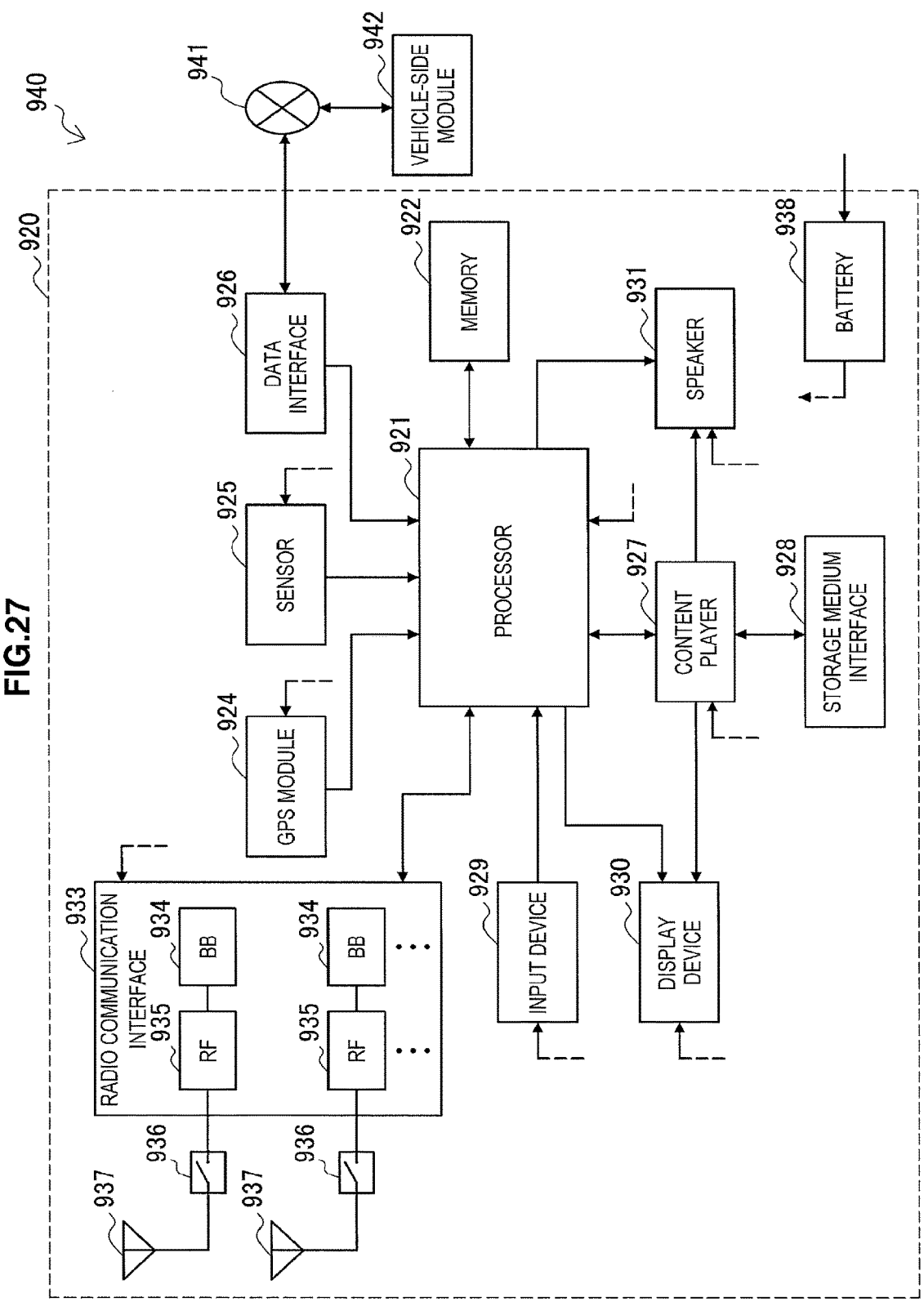
FIG. 27 is a block diagram illustrating an example of a schematic configuration of a car navigation device to which technology according to the present disclosure may be applied.

FIG. 27 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include a plurality of BB processors 934 and a plurality of RF circuits 935 as illustrated in FIG. 27. Note that although FIG. 27 illustrates an example of the radio communication interface 933 including a plurality of BB processors 934 and a plurality of RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among a plurality of circuits included in the radio communication interface 933 (for example, circuits for different radio communication schemes).

Each antenna 937 includes a single or a plurality of antenna elements (for example, a plurality of antenna elements constituting a MIMO antenna), and is used by the radio communication interface 933 to transmit and receive radio signals. The car navigation device 920 may also include a plurality of antennas 937 as illustrated in FIG. 27. Note that although FIG. 27 illustrates an example of the car navigation device 920 including a plurality of antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 27 via power supply lines partially illustrated with dashed lines in the drawing. Also, the battery 938 stores electric power supplied from the vehicle.

In the car navigation device 920 illustrated in FIG. 27, the D2D resource recognition unit 241, the D2D resource modification recognition unit 243, and the D2D communication control unit 245 described with reference to FIG. 16 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

8. CONCLUSION

The communication devices and each process according to the embodiment have been described above with reference to FIGS. 1 to 23. According to the embodiment of the present disclosure, the radio resources (that is, the D2D resources) available for the D2D communication within the cell 10 are decided. Then, the terminal devices 200 located within the cell 10 are notified of the D2D resources. When the D2D resources are modified, the notification of the modification of the D2D resources is given through the paging. When the D2D resources are modified, the D2D resources before the modification are not used for the D2D communication after a predetermined timing and the D2D resources after the modification are used for the D2D communication after the predetermined timing.

Thus, by the notification of the modification of the D2D resources through the paging, even the terminal device 200 in the idle mode can be aware of the D2D resources. Accordingly, the terminal device 200 in the idle mode can be allowed to use the radio resources admitted in the D2D communication. Further, by switching the D2D resources used before and after the predetermined timing, it is possible to suppress an error in the D2D communication. That is, it is possible to avoid occurrence of an error in the D2D communication due to use of different D2D resources between the terminal devices 200 performing the D2D communication. That is, the terminal device in the idle mode of the cellular communication can be allowed to use the radio resources admitted in the D2D communication, and thus it is possible to suppress an error in the D2D communication.

For example, the notification of the D2D resources is given in the system information of the cell 10.

Thus, during the modification period (N+1) of the system information, the D2D resources after the modification can be used after the timing at which the SIB including the D2D resources is first received. After this timing, the D2D resources before the modification are not used. Accordingly, since the D2D resources used before and after the timing are switched, it is possible to suppress an error in the D2D communication.

For example, the D2D resources are any radio resources excluding the specific radio resources (for example, the radio resources for paging or the radio resources for the random access procedure). The specific radio resources are modified with modification of the system information (for example, the paging period T and the parameter nB or the PRACH configuration index). Accordingly, when the D2D resources are transmitted in the system information, the notification of the modified D2D resources can be given in a timely manner.

For example, the radio resources (hereinafter referred to as "D2D resources") available for the D2D communication within the cell 10 are decided based on the information regarding the specific radio resources used by the terminal device 200 in the idle mode of the radio resource control. More specifically, for example, any radio resources excluding the specific radio resources are decided as the D2D resources.

Thus, when the terminal devices 200 are in the idle mode, the terminal devices 200 can perform the D2D communication without influencing cellular communication of the self-devices.

When the D2D communication is used for MTC, the D2D resources decided as described above are particularly effective. The MTC is autonomous communication between devices. As an example of the MTC, a device which is a measuring device transmits measurement data to a nearby device and the nearby device collects the measurement data. In the MTC, the size of data to be transmitted is small, a transmission frequency of data is low, and transmission delay of data is allowed. Further, low cost and low power consumption are necessary in the devices. Therefore, the devices used for the MTC preferably perform the D2D communication when communication circuits are shared between the cellular communication and the D2D communication and the devices are in the idle mode of the cellular communication. Accordingly, when the terminal devices 200 are the devices performing the MTC, the D2D resources decided as described above are particularly effective.

For example, the specific radio resources include the radio resources for paging.

Thus, the radio resources for paging are not decided as the D2D resources, and thus the terminal device 200 does not perform the D2D communication with the radio resources for paging. As a result, the terminal device 200 can be prevented from not receiving the paging message due to the D2D communication.

The radio resources for paging may be radio resources used for the paging in regard to the terminal devices 200 performing the D2D communication within the cell 10.

Thus, when only the radio resources for paging in regard to the terminal devices 200 actually performing the D2D communication are excluded from a target of the D2D resources rather than all of the radio resources for paging, more radio resources can be admitted as the D2D resources. As a result, off-loading in regard to more traffic can be realized. That is, it is possible to suppress consumption of the radio resources and processing loads in an RAN.

For example, the specific radio resources include radio resources used in the random access procedure for transition to the connection mode of the radio resource control.

Thus, the radio resources used in the random access procedure are not decided as the D2D resources, and thus the terminal device 200 does not perform the D2D communication with the radio resources used in the random access procedure. As a result, the terminal device 200 can be prevented from not performing the random access procedure due to the D2D communication.

For example, the radio resources used in the random access procedure are radio resources of the PRACH.

Thus, the terminal device 200 can be prevented from not transmitting the PRACH preamble due to the D2D communication.

As another example, the radio resources used in the random access procedure may be the radio resources selected in advance as the radio resources used in the random access procedure by the terminal devices 200 performing the D2D communication.

Thus, when the radio resources for the random access procedure other than the radio resources of the PRACH are also excluded from the target of the D2D resources, the terminal device 200 does not perform the D2D communication using any radio resources for the random access procedure. As a result, the terminal device 200 can be prevented from not performing a part of the random access procedure due to the D2D communication. From another viewpoint, the terminal device 200 can perform the D2D communication without influencing the random access procedure until a process of the random access procedure is completed.

For example, the radio resources of any subframe which does not include the specific radio resources are decided as the radio resources available for the D2D communication.

Thus, the D2D resources can be indicated as simple information. Accordingly, it is possible to suppress the radio resources used when the terminal device 100 is notified of the D2D resources. Since the D2D resources can be decided easily, the process of deciding the D2D resources can be further simplified. Since the radio resources available for the cellular communication and the radio resources used for the D2D communication are separated on the time axis, communication circuits (for example, RF circuits) can be shared between the cellular communication and the D2D communication.

For example, the decided D2D resources are used for the D2D communication by the terminal devices 200 in the idle mode of the radio resource control and are not used for the D2D communication by the terminal devices 200 in the connection mode of the radio resource control.

In general, there is a possibility of the terminal device 200 in the connection mode receiving a downlink signal destined for the self-device with any subframe. Therefore, when the D2D communication is performed, the terminal device 200 may fail to receive the downlink signal. Therefore, only the terminal device 200 in the idle mode performs the D2D communication using the D2D resources, and thus it is possible to suppress the possibility of the D2D communication interfering with the cellular communication.

For example, the notification of the modification of the D2D resources is given as the modification of the system information through the paging.

Thus, the notification of the modification of the D2D resources can be given without modification of the existing paging message.

The notification of the modification of the D2D resources may be given as modification different from the modification of the system information through the paging and the modification of the D2D resources and may not be given as the modification of the system information through the paging.

Thus, it is possible to suppress a notification frequency of the modification of the system information while notifying the terminal devices 200 of the modification of the D2D resources. Accordingly, the terminal device 200 not performing the D2D communication can be prevented from needlessly searching for a portion changed in the system information.

For example, according to the modification example of the embodiment of the present disclosure, the D2D resources are decided for each group of the D2D communication. Then, the notification of the D2D resources decided for each group of the D2D communication is given.

Thus, more radio resources can be used for the D2D communication in the groups of the D2D communication. More specifically, the radio resources permitted to be used for the D2D communication without problem may differ depending on a D2D group. For example, since the paging occasion differs depending on the terminal device 200, the radio resources for paging can differ depending on the D2D group. Accordingly, when the radio resources for the D2D communication are decided for each D2D group, the amount of radio resources to be excluded can be set to be smaller. As a result, more radio resources can be decided as the D2D resources in each group of the D2D communication, and thus more radio resources can be used.

For example, the D2D resources are decided so that the D2D resources do not overlap between the groups of the D2D communication.

Thus, it is possible to suppress the interference between the groups of the D2D communication.

The D2D resources may be decided so that the D2D resources do not overlap between a first group of the D2D communication and a second group of the D2D communication located near the first group.

Thus, it is possible to suppress the interference between the groups of the D2D communication. Since the same radio resources can be used between the groups of the D2D communication which are not located near each other, more radio resources can be used for the D2D communication.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the example in which the notification of the D2D resources is given in the system information of the cell has been described, but an embodiment of the present disclosure is not limited thereto. For example, the notification of the D2D resources may be given through signaling to an individual terminal device (by the D2D resource notification unit). When the D2D resources are modified, the D2D resources before the modification may not be used for the D2D communication after a predetermined timing and the D2D resources after the modification may be used for the D2D communication after the predetermined timing. For example, the predetermined timing may be a modification timing of the system information. As another example, the predetermined timing may be a start time point of the radio frame of a designated SFN.

The example in which the duplex communication scheme to be adopted is TDD has been described, but an embodiment of the present disclosure is not limited thereto. For example, the duplex communication scheme to be adopted may be FDD. Even in this case, the determination, notification, and modification notification of the D2D resources may be performed as in TDD.

The example in which the D2D communication is performed according to OFDM has been described, but an embodiment of the present disclosure is not limited thereto. Another multiplexing scheme may be used for the D2D communication.

The example in which the terminal device performs MTC has been described, but an embodiment of the present disclosure is not limited thereto. An embodiment of the present disclosure can also be applied to a radio communication system which does not perform MTC. That is, the terminal device may be a device that performs MTC or may be a terminal device that does not perform MTC. For example, an embodiment of the present disclosure may also be applied to a general terminal device conforming to LTE.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (for example, terminal device) to exhibit functions similar to each structural element of the foregoing communication control device. It becomes also possible to provide a storage medium which stores the computer program.

Additionally, the present technology may also be configured as below.

(1)

A communication control device including:

a decision unit configured to decide radio resources available for inter-device communication within a cell; and a notification unit configured to notify a terminal device located within the cell of the radio resources, wherein, when the radio resources are modified, the notification unit gives notification of modification of the radio resources through paging, and wherein, when the radio resources are modified, the radio resources before the modification refrain from being used for the inter-device communication after a predetermined timing and the radio resources after the modification are used for the inter-device communication after the predetermined timing.

(2)
The communication control device according to (1), wherein the notification unit gives notification of the radio resources available for the inter-device communication in system information of the cell.

(3)
The communication control device according to (1), wherein the notification unit gives notification of the radio resources available for the inter-device communication through signaling to an individual terminal device.

(4)
The communication control device according to any one of (1) to (3), wherein the decision unit decides the radio resources available for the inter-device communication based on information regarding specific radio resources used by a terminal device in an idle mode of radio resource control.

(5)
The communication control device according to (4), wherein the decision unit decides any radio resources excluding the specific radio resources as the radio resources available for the inter-device communication.

(6)
The communication control device according to (5), wherein the decision unit decides radio resources of any subframe not including the specific radio resources as the radio resources available for the inter-device communication.

(7)
The communication control device according to any one of (4) to (6), wherein the specific radio resources include radio resources for paging.

(8)
The communication control device according to (7), wherein the radio resources for the paging are radio resources used for paging in regard to a terminal device performing the inter-device communication.

(9)
The communication control device according to any one of (4) to (8), wherein the specific radio resources include radio resources used in a random access procedure for transition to a connection mode of the radio resource control.

(10)
The communication control device according to (9), wherein the radio resources used in the random access procedure are radio resources of a physical random access channel.

(11)
The communication control device according to (9), wherein the radio resources used in the random access procedure are radio resources selected in advance as the radio resources used in the random access procedure by a terminal device performing the inter-device communication.

(12)
The communication control device according to any one of (1) to (11),
wherein the decision unit decides the radio resources available for the inter-device communication for each group of the inter-device communication, and
wherein the notification unit gives notification of the radio resources decided for each group of the inter-device communication.

(13)
The communication control device according to (12), wherein the decision unit decides the radio resources available for the inter-device communication in a manner that the radio resources available for the inter-device communication do not overlap between the groups of the inter-device communication.

(14)
The communication control device according to (13), wherein the decision unit decides the radio resources available for the inter-device communication in a manner that the radio resources available for the inter-device communication do not overlap between a first group of the inter-device communication and a second group of the inter-device communication located near the first group.

(15)
The communication control device according to (2), wherein the notification unit gives notification of the modification of the radio resources available for the inter-device communication as modification of the system information through paging.

(16)
The communication control device according to (2), wherein the notification unit gives notification of the modification of the radio resources available for the inter-device communication as modification different from modification of the system information through paging and refrains from giving the notification of the modification of the radio resources as the modification of the system information through the paging.

(17)
The communication control device according to any one of (1) to (16), wherein the radio resources available for the inter-device communication are used for the inter-device communication by a terminal device in an idle mode of radio resource control and refrain from being used for the inter-device communication by a terminal device in a connection mode of the radio resource control.

(18)
A communication control method including:
deciding radio resources available for inter-device communication within a cell;
notifying a terminal device located within the cell of the radio resources; and
when the radio resources are modified, giving notification of modification of the radio resources through paging,
wherein, when the radio resources are modified, the radio resources before the modification refrain from being used for the inter-device communication after a predetermined timing and the radio resources after the modification are used for the inter-device communication after the predetermined timing.

(19)
A terminal device including:
a resource recognition unit configured to recognize radio resources available for inter-device communication within a cell when the radio resources are decided and notification thereof is given;
a control unit configured to control the inter-device communication in a manner that the recognized radio resources are used for the inter-device communication; and
a modification recognition unit configured to recognize modification of the radio resources when the radio resources are modified and notification of the modification of the radio resources is given through paging,
wherein, when the radio resources are modified, the control unit controls the inter-device communication in a manner that the radio resources before the modification refrain from being used for the inter-device communication after a predetermined timing and the radio resources after the modification are used for the inter-device communication after the predetermined timing.

(20)

A program causing a computer to function as:

a resource recognition unit configured to recognize radio resources available for inter-device communication within a cell when the radio resources are decided and notification thereof is given;

a control unit configured to control the inter-device communication in a manner that the recognized radio resources are used for the inter-device communication; and a modification recognition unit configured to recognize modification of the radio resources when the radio resources are modified and notification of the modification of the radio resources is given through paging, wherein, when the radio resources are modified, the control unit controls the inter-device communication in a manner that the radio resources before the modification refrain from being used for the inter-device communication after a predetermined timing and the radio resources after the modification are used for the inter-device communication after the predetermined timing.

REFERENCE SIGNS LIST 1 radio communication system
10 cell
100 base station
110 antenna unit
120 radio communication unit
130 network communication unit
140 storage unit
150 control unit
151 D2D resource decision unit
153 D2D resource notification unit
155 D2D resource modification notification unit
200 terminal device
210 antenna unit
220 radio communication unit
230 storage unit
240 control unit
241 D2D resource recognition unit
243 D2D resource modification recognition unit
245 D2D communication control unit

The invention claimed is:

1. A communication control device comprising:
circuitry configured to
identify radio resources available for inter-device communication, the identified radio resources being assigned to a terminal device for D2D communication in an idle mode, the identified radio resources being selected among radio resources available for communication in the idle mode and being different than radio resources used for a random access procedure in the idle mode; and
notify the terminal device of the radio resources,
wherein, when the radio resources are modified, the circuitry notifies the terminal device of modification of the radio resources through a paging message including a flag indicating that modified radio resources will be described in a subsequent message, the flag being used for indicating modified radio resources for the terminal device and being used for indicating modification relating to the random access procedure, and
wherein, when the radio resources are modified, the radio resources before the modification refrain from being used for the inter-device communication after a predetermined timing and the radio resources after the modification are used for the inter-device communication after the predetermined timing.

2. The communication control device according to claim 1, wherein the circuitry gives notification of the radio resources available for the inter-device communication in system information.

3. The communication control device according to claim 1, wherein the circuitry gives notification of the radio resources available for the inter-device communication through signaling to an individual terminal device.

4. The communication control device according to claim 1, wherein the circuitry identifies the radio resources available for the inter-device communication based on information regarding specific radio resources used by a terminal device in an idle mode of radio resource control.

5. The communication control device according to claim 4, wherein the circuitry identifies any radio resources excluding the specific radio resources as the radio resources available for the inter-device communication.

6. The communication control device according to claim 5, wherein the circuitry identifies radio resources of any subframe not including the specific radio resources as the radio resources available for the inter-device communication.

7. The communication control device according to claim 4, wherein the specific radio resources include radio resources for paging.

8. The communication control device according to claim 7, wherein the radio resources for the paging are radio resources used for paging in regard to a terminal device performing the inter-device communication.

9. The communication control device according to claim 4, wherein the specific radio resources include radio resources used in a random access procedure for transition to a connection mode of the radio resource control.

10. The communication control device according to claim 9, wherein the radio resources used in the random access procedure are radio resources of a physical random access channel.

11. The communication control device according to claim 9, wherein the radio resources used in the random access procedure are radio resources selected in advance as the radio resources used in the random access procedure by a terminal device performing the inter-device communication.

12. The communication control device according to claim 1,
wherein the circuitry identifies the radio resources available for the inter-device communication for each group of the inter-device communication, and
wherein the circuitry gives notification of the radio resources identified for each group of the inter-device communication.

13. The communication control device according to claim 12, wherein the circuitry identifies the radio resources available for the inter-device communication in a manner that the radio resources available for the inter-device communication do not overlap between the groups of the inter-device communication.

14. The communication control device according to claim 13, wherein the circuitry identifies the radio resources available for the inter-device communication in a manner that the radio resources available for the inter-device communication do not overlap between a first group of the inter-device communication and a second group of the inter-device communication located near the first group.

15. The communication control device according to claim 2, wherein the circuitry gives notification of the modification of the radio resources available for the inter-device communication as modification of the system information through paging.

16. The communication control device according to claim 2, wherein the circuitry gives notification of the modification of the radio resources available for the inter-device communication as modification different from modification of the system information through paging and refrains from giving the notification of the modification of the radio resources as the modification of the system information through the paging.

17. The communication control device according to claim 1, wherein the radio resources available for the inter-device communication are used for the inter-device communication by a terminal device in an idle mode of radio resource control and refrain from being used for the inter-device communication by a terminal device in a connection mode of the radio resource control.

18. A communication control method comprising:
identifying radio resources available for inter-device communication, the identified radio resources being assigned to a terminal device for D2D communication in an idle mode, the identified radio resources being selected among radio resources available for communication in the idle mode and being different than radio resources used for a random access procedure in the idle mode;
notifying the terminal device of the radio resources; and
when the radio resources are modified, notifying the terminal device of modification of the radio resources through a paging message including a flag indicating that modified radio resources will be described in a subsequent message, the flag being used for indicating modified radio resources for the terminal device and being used for indicating modification relating to the random access procedure, and
wherein, when the radio resources are modified, the radio resources before the modification refrain from being used for the inter-device communication after a predetermined timing and the radio resources after the modification are used for the inter-device communication after the predetermined timing.

19. A terminal device comprising:
circuitry configured to
recognize radio resources available for inter-device communication when the radio resources are identified and notification thereof is given, the radio resources being assigned to terminal devices including the terminal device for D2D communication in an idle mode, the radio resources being selected among radio resources available for communication in the idle mode and being different than radio resources used for a random access procedure in the idle mode;
control the inter-device communication in a manner that the recognized radio resources are used for the inter-device communication; and
recognize modification of the radio resources when the radio resources are modified and notification of the modification of the radio resources is given through a paging message including a flag indicating that modified radio resources will be described in a subsequent message, the flag being used for indicating modified radio resources for the group of terminal devices and being used for indicating modification relating to the random access procedure, and
wherein, when the radio resources are modified, the circuitry controls the inter-device communication in a manner that the radio resources before the modification refrain from being used for the inter-device communication after a predetermined timing and the radio resources after the modification are used for the inter-device communication after the predetermined timing.

20. An electronic device comprising:
circuitry configured to
receive radio resource information for Device-to-Device (D2D) communication, the radio resources indicated by the radio resource information being assigned to electronic devices including the electronic device for D2D communication in an idle mode, the radio resources being selected among radio resources available for communication in the idle mode and being different than radio resources used for a random access procedure in the idle mode;
perform D2D communication with another electronic device in the idle mode;
obtain modified radio resource information for the D2D communication after receiving, in the idle mode, a paging message including a flag indicating that the modified radio resources will be described in a subsequent message, the flag being used for indicating modified radio resources for the group of electronic devices and being used for indicating modification relating to the random access procedure; and
communicate with another electronic apparatus via the D2D communication using resources indicated by the modified radio resource information.

* * * * *